United States Patent
Williams et al.

(10) Patent No.: US 9,345,372 B2
(45) Date of Patent: *May 24, 2016

(54) VACUUM APPLIANCE FILTER ASSEMBLIES AND ASSOCIATED VACUUM SYSTEMS

(71) Applicant: Emerson Electric Co., St. Louis, MO (US)

(72) Inventors: Matthew A. Williams, Bridgeton, MO (US); Terrence L. Stanek, St. Charles, MO (US); Jeffrey L. Young, St. Peters, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/021,959

(22) Filed: Sep. 9, 2013

(65) Prior Publication Data

US 2014/0008289 A1 Jan. 9, 2014

Related U.S. Application Data

(63) Continuation of application No. 12/243,921, filed on Oct. 1, 2008, now Pat. No. 8,206,482, and a continuation of application No. 13/488,746, filed on Jun. 5, 2012, now Pat. No. 8,557,008.

(60) Provisional application No. 61/078,362, filed on Jul. 4, 2008.

(51) Int. Cl.
*A47L 9/18* (2006.01)
*B01D 46/24* (2006.01)
*B01D 46/42* (2006.01)
(Continued)

(52) U.S. Cl.
CPC . *A47L 9/18* (2013.01); *A47L 9/127* (2013.01); *B01D 46/2414* (2013.01); *B01D 46/4227* (2013.01); *B01D 46/521* (2013.01);
(Continued)

(58) Field of Classification Search
CPC .......... A47L 9/1427; A47L 5/28; A47L 9/20; B01D 46/10; B01D 46/02; B01D 46/4227; B01D 46/0068; B01D 46/0086
USPC .............. 55/467, 357, 498, 501, 502, DIG. 3, 55/500, 521; 96/223; 210/471, 487, 493.1, 210/494.1, 497.01, 470
See application file for complete search history.

(56) References Cited

U.S. PATENT DOCUMENTS 2,962,121 A 11/1960 Wilber
3,290,870 A 12/1966 Jensen
(Continued)

OTHER PUBLICATIONS

Wilkinson, S., office action issued for Canadian patent application No. 2669056, Canadian Intellectual Property Office, dated Sep. 1, 2015.

*Primary Examiner* — Duane Smith
*Assistant Examiner* — Minh-Chau Pham
(74) *Attorney, Agent, or Firm* — Sutton McAughan Deaver PLLC

(57) ABSTRACT

Vacuum cleaner filters, in particular replaceable vacuum cleaner filters suitable for both dry and wet/dry type vacuum cleaners are disclosed, as well as systems incorporating the use of such filters and methods for their use. The filters include a plurality of adjacently positioned pleats arranged in a closed circumferential, cylindrically-shaped path, a top end cap having a central orifice capable of constricting a post on a vacuum filter cage, and optionally a molded end ring oppositely-spaced from the top end cap for engagement with the motor housing of a vacuum cleaner.

16 Claims, 21 Drawing Sheets

(51) Int. Cl.
*B01D 46/52* (2006.01)
*A47L 9/12* (2006.01)

(52) U.S. Cl.
CPC ............ *B01D2265/028* (2013.01); *Y10S 55/03* (2013.01); *Y10S 55/08* (2013.01)

(56) References Cited

U.S. PATENT DOCUMENTS

| | | | |
|---|---|---|---|
| 3,365,864 A | 1/1968 | Iizima | |
| 3,399,516 A | 9/1968 | Hough, Jr. et al. | |
| 3,838,978 A | 10/1974 | Eddleman et al. | |
| 4,164,400 A | 8/1979 | Wald | |
| 4,171,963 A | 10/1979 | Schuler | |
| 4,185,974 A | 1/1980 | Hiester | |
| 4,229,193 A | 10/1980 | Miller | |
| 4,268,289 A | 5/1981 | Polaner | |
| 4,609,387 A | 9/1986 | Berfield et al. | |
| 4,619,674 A | 10/1986 | Erdmannsdorfer | |
| 4,619,675 A | 10/1986 | Watanabe | |
| 4,906,265 A | 3/1990 | Berfield | |
| 4,917,942 A | 4/1990 | Winters | |
| 4,976,858 A | 12/1990 | Kadoya | |
| D333,891 S | 3/1993 | Reed, Jr. et al. | |
| 5,230,722 A | 7/1993 | Yonkers | |
| 5,248,323 A | 9/1993 | Stevenson | |
| 5,404,614 A * | 4/1995 | Stephens | 15/327.2 |
| 5,455,983 A | 10/1995 | Crouser et al. | |
| 5,608,945 A | 3/1997 | Crouser et al. | |
| 5,647,982 A | 7/1997 | Haythornthwaite | |
| D383,881 S | 9/1997 | Gudmundsson | |
| D389,284 S | 1/1998 | Gudmundsson | |
| D389,963 S | 1/1998 | Scanlon et al. | |
| 5,733,351 A | 3/1998 | Hult et al. | |
| 5,783,086 A | 7/1998 | Scanlon et al. | |
| D400,323 S | 10/1998 | Scanlon et al. | |
| 5,824,125 A * | 10/1998 | Sherwood | 55/379 |
| 5,840,103 A | 11/1998 | Dyson | |
| 5,895,510 A | 4/1999 | Butler et al. | |
| 6,010,550 A | 1/2000 | Song | |
| 6,101,669 A * | 8/2000 | Martin et al. | 15/327.2 |
| 6,110,248 A | 8/2000 | Liu | |
| 6,113,663 A | 9/2000 | Liu | |
| 6,162,287 A | 12/2000 | Rohn et al. | |
| D441,155 S | 4/2001 | Thur et al. | |
| 6,214,077 B1 | 4/2001 | Bitner et al. | |
| D443,740 S | 6/2001 | Stratford | |
| D445,974 S | 7/2001 | Stratford | |
| 6,312,508 B1 | 11/2001 | Alberts, III et al. | |
| 6,341,404 B1 * | 1/2002 | Salo et al. | 15/353 |
| 6,432,180 B2 | 8/2002 | Alberts, III et al. | |
| 6,440,191 B1 | 8/2002 | Berfield et al. | |
| D472,683 S | 4/2003 | Stratford | |
| 6,565,637 B2 | 5/2003 | Alberts, III et al. | |
| 6,746,518 B2 | 6/2004 | Gieseke et al. | |
| D494,329 S | 8/2004 | Thur et al. | |
| 6,913,635 B2 | 7/2005 | Yoo et al. | |
| 6,966,935 B1 | 11/2005 | Neighbors et al. | |
| D522,194 S | 5/2006 | Mason | |
| 7,247,182 B2 | 7/2007 | Boyer, Jr. et al. | |
| 7,267,704 B2 | 9/2007 | Allgeier | |
| 7,374,594 B2 | 5/2008 | Gierer | |
| 7,374,595 B2 | 5/2008 | Gierer | |
| 7,384,440 B2 | 6/2008 | Takano et al. | |
| 7,753,980 B2 | 7/2010 | Kobayashi et al. | |
| 8,167,966 B2 | 5/2012 | Amirkhanian et al. | |
| 8,206,482 B2 * | 6/2012 | Williams et al. | 55/498 |
| 2002/0166199 A1 | 11/2002 | Boles et al. | |
| 2003/0046790 A1 * | 3/2003 | Crevling et al. | 15/353 |
| 2005/0198766 A1 | 9/2005 | Nam et al. | |
| 2006/0016044 A1 | 1/2006 | Wiedemann | |
| 2006/0123589 A1 | 6/2006 | Kim | |
| 2006/0174597 A1 | 8/2006 | Green | |
| 2007/0113525 A1 * | 5/2007 | Gierer | 55/467 |
| 2007/0113529 A1 | 5/2007 | Gierer | |
| 2008/0110142 A1 | 5/2008 | Nelson et al. | |
| 2008/0209875 A1 | 9/2008 | Treier et al. | |
| 2008/0245039 A1 | 10/2008 | Anderson et al. | |
| 2009/0183338 A1 | 7/2009 | Van Raalte et al. | |
| 2009/0183633 A1 | 7/2009 | Schiller et al. | |
| 2009/0249754 A1 | 10/2009 | Amirkhanian et al. | |
| 2010/0139032 A1 * | 6/2010 | Tomasiak | 15/347 |
| 2010/0212271 A1 | 8/2010 | Gieseke et al. | |
| 2010/0319307 A1 | 12/2010 | Kim et al. | |
| 2011/0000047 A1 | 1/2011 | Ji et al. | |
| 2012/0311811 A1 * | 12/2012 | Hollis et al. | 15/327.1 |
| 2013/0228194 A1 * | 9/2013 | Holsten | 134/6 |
| 2014/0174296 A1 * | 6/2014 | Schultz et al. | 96/226 |
| 2014/0237763 A1 * | 8/2014 | Holsten et al. | 15/352 |
| 2014/0298612 A1 * | 10/2014 | Williams et al. | 15/347 |
| 2014/0311107 A1 | 10/2014 | Sobel | |
| 2014/0373306 A1 * | 12/2014 | Tomasiak | 15/347 |

* cited by examiner

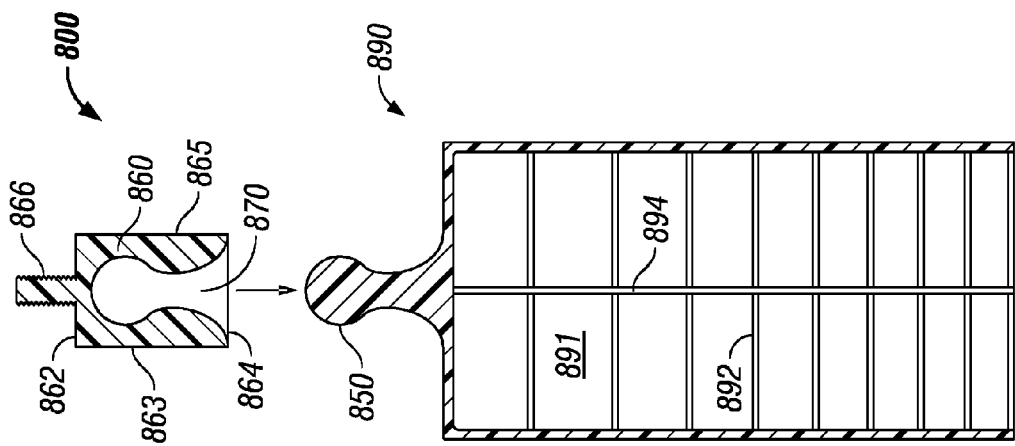
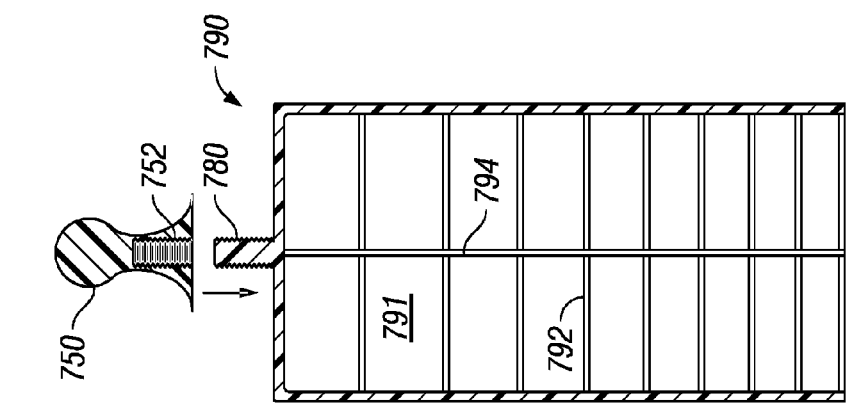
FIG. 12A
FIG. 12B

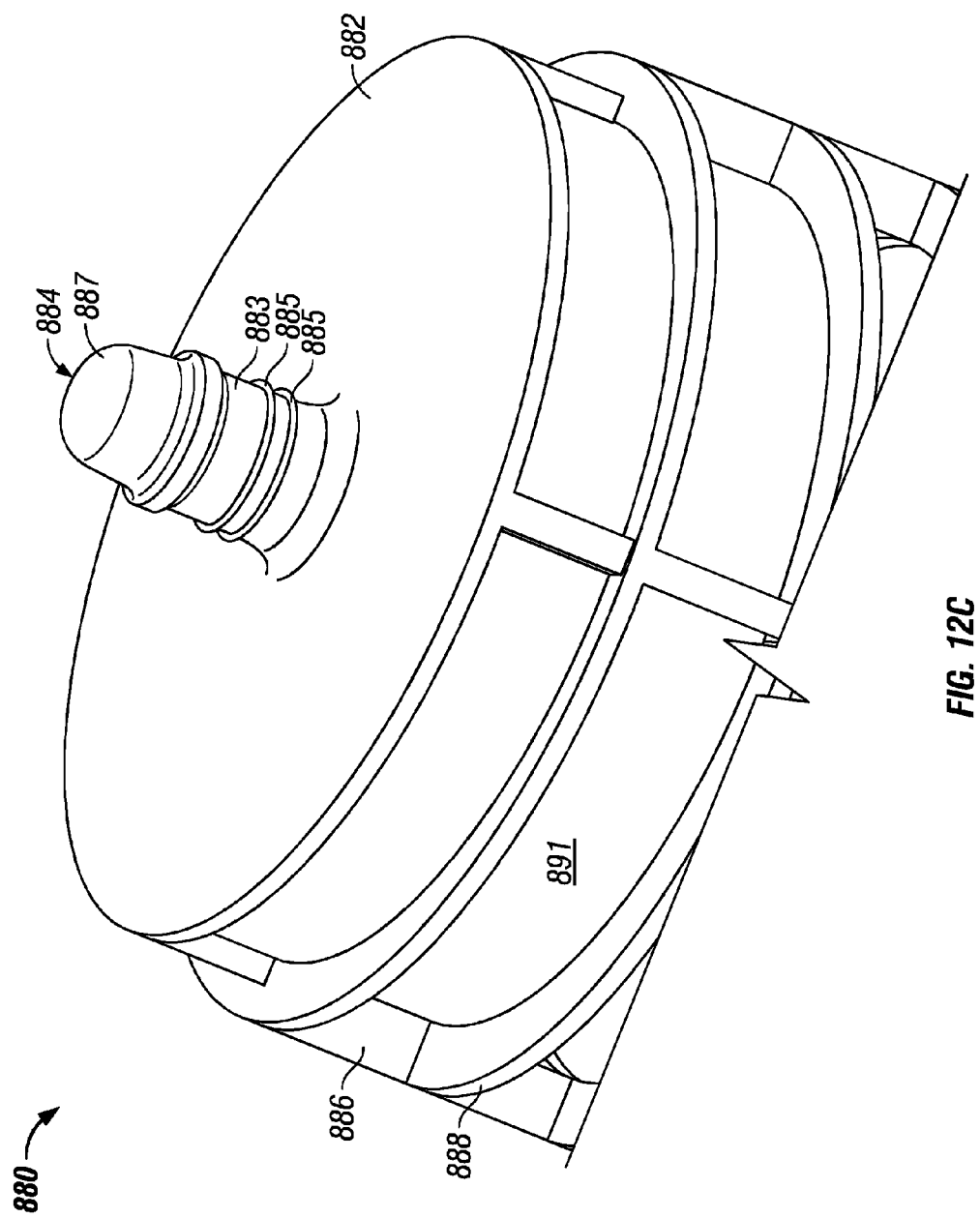

VACUUM APPLIANCE FILTER ASSEMBLIES AND ASSOCIATED VACUUM SYSTEMS

CROSS REFERENCE TO RELATED APPLICATIONS

The present application is a continuation application of U.S. patent application Ser. No. 13/488,746, now U.S. Pat. No. 8,557,008, which is a continuation application of U.S. patent application Ser. No. 12/243,921, now U.S. Pat. No. 8,206, both of which claims priority to U.S. Provisional Patent Application Ser. No. 61/078,362, filed Jul. 4, 2008, the contents of both of which are incorporated herein by reference in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

This disclosure relates generally to filters for vacuum cleaners, and more particularly to replaceable filters for vacuum cleaners, as well as vacuum appliance systems incorporating and using such filters.

2. Description of the Related Art

Vacuum appliances, in particular vacuum cleaners and wet/dry vacuum cleaners, whether they be strictly relegated to cleaning up dry materials, or if they are capable of both wet and dry clean up, require some method to separate the dust and the dirt from the air that is exhausted back into the surroundings during operation. Typically, vacuum filters are used in order to prevent debris from re-entering the area being cleaned. Hence, filters are commonly used to perform these separation functions. Associated with the use of such filters is often a need to remove and re-attach the filter from the vacuum appliance, for example, when cleaning the filter or replacing an old or damaged filter with a new filter. Further, with regard to vacuum cleaners of the type known as "wet/dry" vacuum cleaners, the filter is often also removed when the vacuum cleaner is suctioning liquids. Consequently, special structures often accompany a typical wet/dry vacuum cleaner in order to accommodate removing and replacing the filter.

With regard to the operation of a vacuum appliance or related air-moving system, it is typical that a suction system with a motor creates the vacuum and is mounted in a lid that is removably attached to a collection drum for receiving the vacuumed materials. A portion of the lid, herein termed a mounting assembly, extends at least partially downward into the drum and mounts a filter support assembly, commonly referred to as a "filter cage," that generally covers a vacuum intake to the suction assembly in the lid. The cage can be made of plastic such as polypropylene, may be generally a cylindrically-shaped molded or extruded part having a series of axial and circumferential support ribs with a large percentage of open surface area to support the filter extended around the cage, and acts (at least in part) to prevent the unwanted radially inward collapse of the filter during vacuum operation. The axial ribs typically align with a longitudinal axis through the cage and the circumferential ribs are often at substantially right angles to the axial ribs. This type of cage construction creates a relatively stiff component in the axial direction. In addition to supporting the filter, the cage can provide a safety shield from user access to the impeller, and may further optionally contain a float or similar device that protects the vacuum cleaner from water being inadvertently suctioned into the impeller.

The vacuum system inside the lid of the vacuum typically suctions external dirty air or water through a hose into an opening in the drum or lid so that the dirt or water is deposited into the drum. Remaining material, mainly air, then flows radially inward through the filter for removal of dirt and debris and continues through the cage into a suction impeller in the lid, and then is exhausted from the vacuum cleaner.

The filter is commonly attached to the mounting assembly by a threaded stud, or "cage stem", and nut combination on the end of the cage, which acts to place the filter in axial compression, utilizing the longitudinal stiffness of the axial ribs. In typical use, the filter is inserted over the cage, and a mounting flange of rigid material, such as plastic, is attached to the cage or mounting assembly and used to compress or "sandwich" the filter between the flange and the mounting assembly. The compressive, mechanical force on the entire filter body and its filter element is the primary force used to seal the filter to the vacuum cleaner and prevent unwanted leakage through the vacuum cleaner. Thus, a structurally sound and supportive cage is important to the overall function of the filter and in general the vacuum cleaner. The filter may also be attached in position by some other method, such as clamping one or more seals of the filter directly to the mounting assembly or lid. A structurally rigid cage is again necessary to guard against entry of unwanted objects, or fingers, into the impeller and to house the intake cutoff float.

Experience has shown that while these vacuum filter systems and mechanisms work, they often suffer from being awkward or cumbersome to use, which in turn makes the changing of the filter itself difficult, cumbersome, or time consuming. Further, those vacuum systems wherein the filter is attached to a mounting assembly by way of a threaded stud-and-nut system on the end of the filter cage, using a threaded nut to retain the filter in a state of axial compression, can be time consuming to operate, and the employment of a separate filter nut or similar attachment mechanism is undesirable because such parts can be readily lost or misplaced during the course of filter replacements. Additionally, some of the more complex filter system designs employ mechanisms that add unnecessary cost to the overall vacuum appliance product. Finally, those filter system designs that do not use or require filter retaining mechanisms can often result in the filter becoming readily dislodged and/or the seal of the filter to the vacuum is broken when the vacuum is dropped or jarred, which in turn can damage both the filter itself, and cause unwanted leakage of liquid or debris into the vacuum system and motor.

This application for patent discloses filter assemblies for use with vacuum appliances, such as wet/dry vacuum cleaners, which eliminates the need for any separate retaining mechanism to install the filter to the vacuum appliance, allows the filter to be replaced and/or cleaned quickly and effectively, readily seals to the mounting assembly of the vacuum appliance, remains secure during normal operation without unwanted dislodgment from the jarring and rough handling of the vacuum appliance, and which is readily retrofit to existing vacuum appliance units already in the marketplace, negating the consumer from having to purchase a new vacuum appliance, such as a new wet/dry vacuum, in order to use the filter assemblies of the present disclosure.

BRIEF SUMMARY OF THE INVENTION

The inventions described herein are to filter assemblies for use with vacuum appliances, systems including such filter assemblies, and methods for attaching such filter and filter assemblies to a vacuum appliance. In accordance with one aspect of the present disclosure, a filter for use with a wet/dry vacuum appliance is described, wherein the filter comprises a cap portion having a hole or formed opening extending therethrough; a spaced apart annular end ring; and a shaped filter spaced intermediate between the cap and the end ring and extending in a closed, circumferential path that forms a closed, interior path, wherein the hole or opening may be circumscribed by a retaining ring, and wherein the cap and the end ring are comprised of an flexible material. The cap may be substantially planar or substantially non-planar, and may also include one or more handles for use in improve the ease of removal of the filter assembly from a mounting post or stem of a vacuum filter cage. The annular hole or formed opening may be substantially centrally located in the cap portion of the filter assembly, or may be off-set from the axial center axis of the cap portion of the filter assembly, as appropriate. Additionally, the filter itself may be cylindrically-shaped, oval-shaped, conically shaped, elliptical, or rectangular-shaped, without limitation, and may be pleated or non-pleated, as appropriate.

In accordance with yet another aspect of the present disclosure, a filter for use with a wet/dry vacuum appliance is described, wherein the filter comprises a cap having an annular hole or opening extending therethrough which may be centrally-located or not; an annular end ring; and a filter positioned intermediate between the cap and the end ring and extending in a circumferential path that forms a closed, interior path, wherein the annular hole is circumscribed by a retaining structure, and wherein the cap and the end ring are comprised of a flexible material bonded to the filter, such that when the cap is in association with the wet/dry vacuum appliance, the cap seals on a plane below the top surface of the filter. In a similarly related aspect of the instant disclosure, a filter for use with a wet/dry vacuum appliance is described, wherein the filter comprises a cap having a centrally-located annular hole extending therethrough; an annular end ring; and a filter positioned between the cap and the end ring and extending in a closed, circumferential path that forms a closed, interior path, wherein the centrally-located annular hole is circumscribed by a retaining ring, and wherein the cap and the end ring are comprised of a flexible material bonded to the filter. In further accordance with this aspect of the present disclosure, a filter for use with a wet/dry vacuum appliance is described, wherein the filter comprises a cap having a centrally-located opening extending therethrough; an annular end ring; and a filter positioned between the cap and the end ring and extending in a circumferential path that forms a closed, interior region, wherein the cap and the end ring are comprised of a flexible material, such as an elastomeric material, bonded to the filter. In further accordance with these aspects of the disclosure, the centrally-located opening may be circumscribed by a retaining ring or similar retaining means, wherein the retaining ring is either integrally formed with the cap, or is not integrally formed with the cap.

In accordance with another aspect of the present disclosure, a filter assembly for use with a wet/dry vacuum appliance is described, wherein the filter assembly comprises a cap having a centrally-located opening extending therethrough, and annular end ring, and a filter positioned between the cap and the end ring and extending in a circumferential path that forms a closed, interior region, wherein the cap comprises a stem cover defining an inner region circumscribing the centrally-located opening, and wherein the cap and the end ring are comprised of a flexible material bonded to the filter.

In accordance with a further aspect of the present disclosure, a vacuum cleaner system for use in picking up both dry and wet debris using air movement is described, wherein the system comprises a filter cage associated with a lid assembly or motor housing of a vacuum cleaner, and a filter assembly. The filter cage assembly comprises a bottom face and a mounting post extending substantially perpendicular to the bottom face of the filter cage. The filter assembly comprises a cap having a centrally located annular hole extending there through, an annular end ring, and a filter spaced intermediate between the cap and the end ring and extending in a closed, circumferential path that forms a closed interior path and wherein the centrally located annular hole is circumscribed by a retaining ring which may be integrally formed with the top face or non-integrally attached to the top face. In accordance with this aspect of the disclosure, the annular hole has an area less than the area of the shaped, leading end of the mounting post, such that the annular hole of the filter assembly expands to fit over the shaped leading end of the mounting post as the post is pushed or pulled through and then contracts once the leading end has passed through, allowing the filter assembly to be retained in position against the bottom face of the filter cage by the integrally-formed retaining ring and the constriction of the filter hole against the post. Additionally, the mounting post of the filter cage may have any number of shapes, including an hour-glass shape, such that the hourglass shape may be defined by two outer regions and an inner region, the outer regions having a diameter greater than the diameter of the inner region, and wherein such a shaped mounting post acts to enhance the seal of filter assemblies against the filter cage. In further accordance with this aspect of the present disclosure, as a system, the filter assembly fits over the top of the filter cage and the mounting post extends at least partially through the centrally-located opening in the cap of the filter, and is retained in position by an integrally-formed retaining ring on the cap, wherein the centrally-located opening has an uncompressed diameter smaller than a diameter of a portion of the mounting post such that, during assembly, the centrally-located opening expands in diameter to fit over a portion of the mounting post, and thereafter contracts in diameter so as to retain the filter over the filter cage.

In accordance with another aspect of the present disclosure, a vacuum cleaner system is described, wherein the system comprises a filter cage comprising a top face, a bottom face opposite the top face, and a mounting post extending substantially perpendicular to the bottom face of the filter cage; and a filter assembly comprising a cap having an opening extending therethrough, an annular end ring, and a filter positioned between the cap and the end ring and extending in a closed, circumferential path that forms a closed interior path, wherein the opening in the cap is circumscribed by an elastomeric material, wherein the filter assembly fits over the top of the filter cage and a portion of the mounting post extends through the opening in the cap of the filter assembly and is retained in position by the elastomeric material, and wherein the opening in the cap has an uncompressed diameter smaller than the diameter of a portion of the mounting post, such that during assembly the opening expands in diameter to fit over the portion of the mounting post, and thereafter contracts in diameter to retain the filter assembly over the filter cage.

In accordance with a further aspect of the present disclosure, a wet/dry vacuum cleaner is described, which comprises a filter cage including a projection extending therefrom, the filter cage having a length; and a filter assembly which includes a cap formed of deformable material that defines an opening, and, a filter extending from the cap, wherein the filter has a length that is longer than the length of the filter cage; wherein the filter is coupled to the cage by positioning the filter about the cage such that the length of the filter extends along the length of the cage and such that the projection from the filter cage extends through the opening of the filter cap such that the filter is retained in place at least in part by compressive forces resulting from the compression of the deformable material that defines the opening being applied against the projection; and wherein the engagement of the projection with the opening causes a deformation of the deformable material such that the cap assumes a substantially conical shape. In further accordance with this aspect of the disclosure, the filter cage may be attached to a motor housing of a vacuum appliance, wherein the conical shape formed by the deformed material is such that the point of the cone points in a direction towards the motor housing. In still further accordance with this aspect of the disclosure, when the filter cage is attached to a motor housing of a vacuum appliance, the conical shape formed by the deformed material is such that the point of the cone points in a direction extending away from the motor housing.

In a further aspect of the present disclosure, an apparatus, such as a vacuum apparatus or the like, is described, wherein the apparatus comprises a filter cage that includes a first end and a second end and a mounting projection extending from the second end; and, a filter assembly including a filter extending about the filter cage, the filter including a first end and a second end, a mounting cap positioned at the second end of the filter, the mounting cap being at least partially formed of flexible material and defining an opening; wherein the mounting projection extends through the opening defined by the mounting cap such that the mounting cap engages a region of the mounting projection; and wherein the distance from the first end of the filter cage to the region where the mounting cap engages the mounting projection is less than the distance from the first end of the filter cage to the second end of the filter assembly.

In another aspect of the present disclosure, a method of attaching a filter to the filter cage of a wet/dry vacuum is described, wherein the method comprises the steps of providing a filter cage that includes a first end and a second end and a mounting projecting extending from the second end, the mounting projection defining a mounting region; providing a filter assembly including a first end, a second end, and a mounting cap positioned at the second end of the filter, the mounting cap being at least partially formed of a deformable material and defining an opening; positioning the filter assembly about the filter cage such that the filter assembly fits over the filter cage and such that the second end of the filter assembly is positioned closer to the second end of the filter cage than to the first end of the filter cage; and deforming the mounting cap to cause the mounting projection to extend through the opening in the end cap and to cause the end cap to engage the mounting region of the mounting projection.

In accordance with a further aspect of the present disclosure, a filter assembly for use with a wet/dry vacuum appliance is described, wherein the filter assembly comprises a generally cylindrical filter comprising pleated material, the filter defining a first end; and a mounting cap coupled to the first end of the filter, the mounting cap defining a generally cylindrical opening near the center of the mounting cap and a ring extending about the opening, wherein the mounting cap has an elastomeric characteristic that allows the mounting cap to be deformed to take a substantially conical shape, and wherein the ring has an elastomeric characteristic that allows the ring to be deformed such that it exerts compressive forces radially inward towards the center of the cylindrical opening.

In a further aspect of the present disclosure, a filter assembly for use in a wet/dry vacuum that includes a mounting element is described, wherein the wet/dry filter assembly comprises a filter means for filtering particulate matter collected by the wet/dry vacuum, and elastomeric retention means for creating compressive forces tending to retain the filter assembly in a fixed position with respect to a point on the wet/dry vacuum when at least a portion of the mounting element is positioned within an opening formed in the elastomeric retention means.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 12A illustrates a side, partial cut-away view of a filter cage assembly for use with the present disclosure, showing a retro-fit of prior cages assemblies.

FIG. 12B illustrates a side, partial cut-away view of an alternative filter cage assembly for use with the present disclosure, showing a retro-fit of a cage assembly.

FIG. 12C illustrates a partial, perspective view of the bottom face and mounting post of a further alternative filter cage assembly for use in accordance with the present disclosure.

Figure 1:
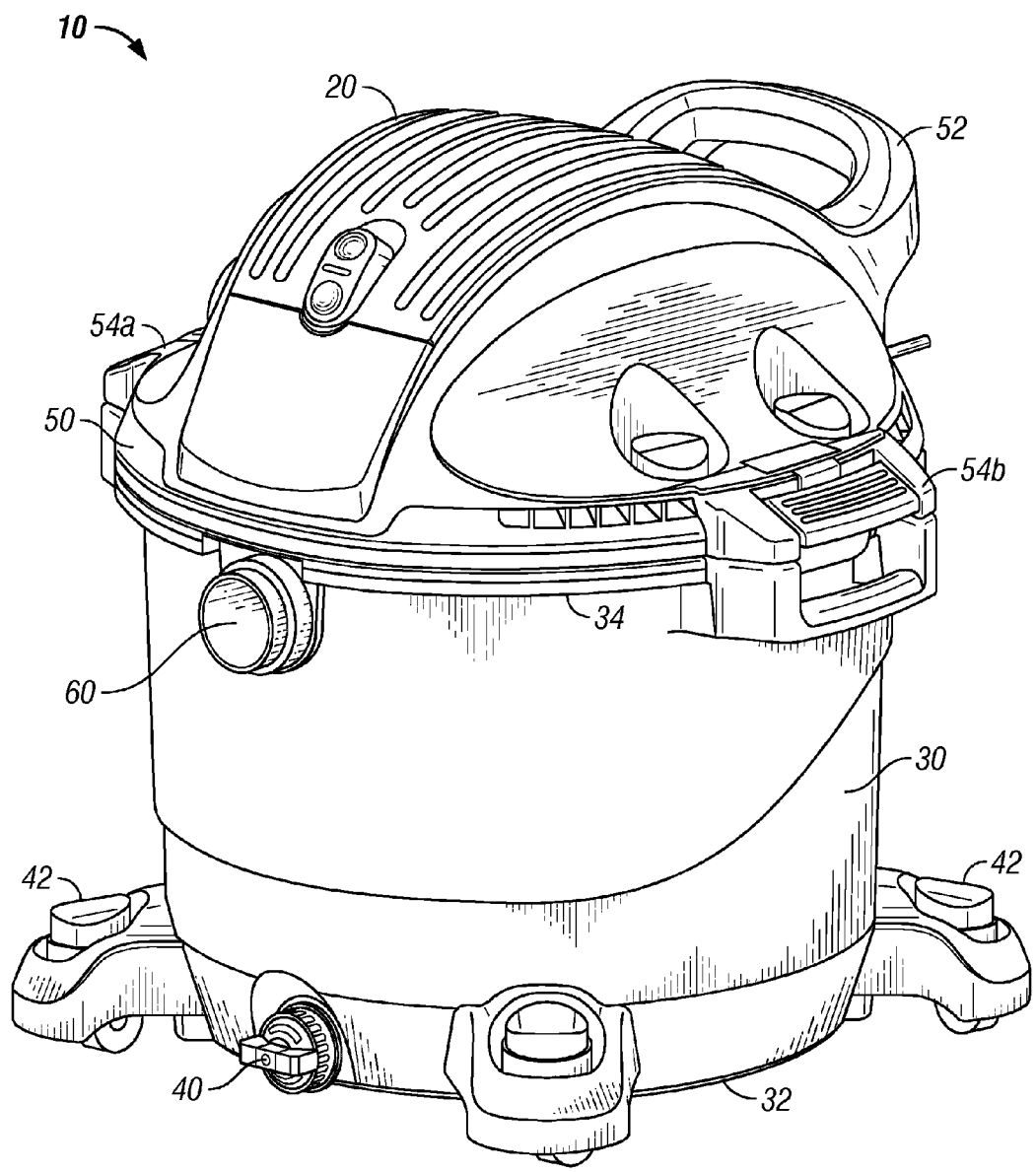
FIG. 1 illustrates a perspective view of an exemplary vacuum appliance system associated with the vacuum filters of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

In general terms, Applicants have created filter assemblies for use with vacuum appliances, such as wet/dry vacuum cleaners, which eliminate the need for separate retaining mechanism to install the filter to the vacuum appliance, allows the filter to be replaced or cleaned quickly and effectively, seals automatically to the mounting assembly of the vacuum appliance, remains secure during normal operation without unwanted dislodgment from the jarring and rough handling of the vacuum appliance, and which is readily retrofit to existing vacuum cleaner units already in the marketplace.

Turning now to the figures, FIG. 1 illustrates a schematic, perspective view of an exemplary vacuum appliance system 10 for use with the filter systems of the present disclosure, wherein the system shown is a wet/dry vacuum appliance 20 comprising a collection drum or chamber 30, casters 42 mountable on the bottom end 32 of the drum 30, and a lid 50 removably attached to top end 34 of the collection drum 30 containing a powerhead. The lid 50 is removably attached (e.g., via a hinge mechanism or the like, or via completely lifting off from the top of drum 30 by releasing latches 54) to the collection drum 30 so that the lid can be readily removed so as to empty debris or liquids contained within the drum, or as relates to the present disclosure, to change or clean the filter assembly (not shown) that is typically mounted in association with the underside of a motor housing, powerhead, or lid of the vacuum appliance. As with most known wet/dry vacuum cleaners, a motor (not shown) is generally coupled to the mounting assembly on the inside portion of lid 50 of the vacuum cleaner 20, which is operable to create the vacuum inside the collection drum 30 so as to draw solid debris, liquid, or both into the collection drum 30 through an inlet port 60 by way of a vacuum hose (not shown). The collection drum 30 may also optionally include a drain 40 so that liquid within the drum can be emptied (e.g., via a pump such as that described in U.S. Design Pat. No. D551,681) and removed without having to undo and remove the lid 50. Vacuum appliances such as the system 10 generally include a filter assembly as will be described herein, as well as a mounting assembly and/or a filter cage (not shown) which will be described in more detail herein, and which is typically coupled to or integrally formed with the underside of the lid 50 or motor housing, extending downwardly into collection drum 30.

The vacuum appliance itself, including the collection chamber/drum 30 and the lid and powerhead 50 may be made of any number of lightweight, relatively inexpensive plastics or polymers of suitable strength and rigidity, including but not limited to polypropylene, polyurethane, and other similar materials. The motor frame and other select parts of the general vacuum assembly may be made of a material more rigid and having a smaller flex modulus than that comprising the collection chamber, exemplary materials including but not being limited to glass-filled polyester, glass-filled polycarbonate, thermoset polyester, and similar polymeric materials, all of which are heavier, and often more expensive, than the material used to make the collection chamber.

Figure 2:
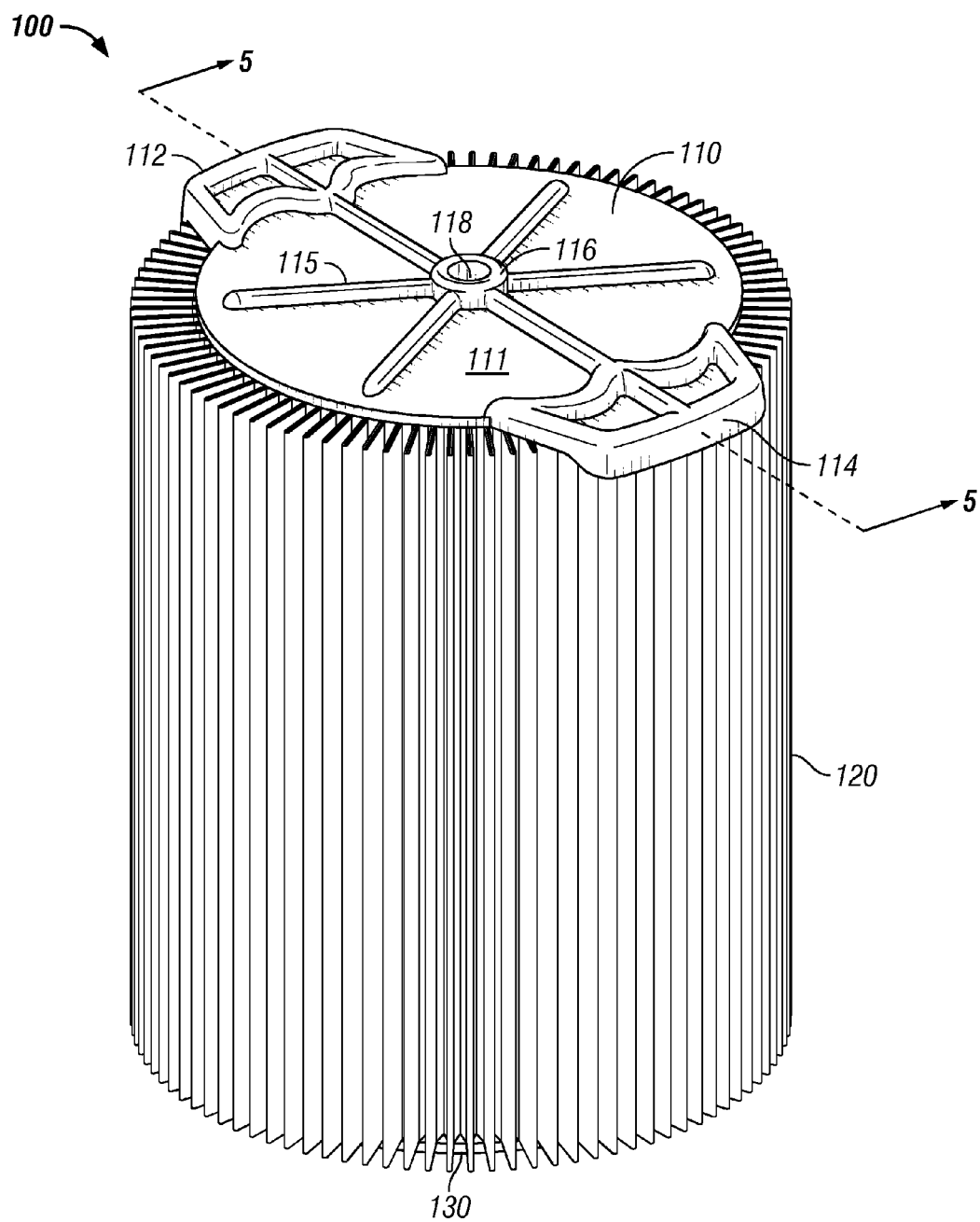
FIG. 2 illustrates a perspective view of an exemplary vacuum filter of the present disclosure.

FIGS. 2-5 illustrate a filter assembly 100 in accordance with aspects of the present disclosure. In FIG. 2, a perspective view of filter assembly 100 is illustrated, which comprises an integrally-formed an integrated cap section 110, an end ring 130 (not shown), and, a generally cylindrically-shaped, pleated filter 120 intermediate between cap 110 and end ring 130 and extending in a closed, circumferential path and which includes and forms a closed, interior region. The integrated cap 110 may further, optionally comprise two integrally-formed handle portions 112, 114 as shown, and a formed hole 118 in the center of the cap, centrally-formed hole 118 extending from the top surface 111 of cap 110 through the cap to the closed, interior airflow path formed by filter 120. The cap 110 may also optionally comprise a plurality of integrally-formed support struts 115, to add structural integrity to the cap section 110. As shown in the figure, the handle portions 112 and 114 may be substantially diametrically opposed in orientation, and can extend partially over the top and edges of the pleated filter 120, so as to allow for providing the user with a gripping surface to aid in filter removal from the filter cage of a vacuum appliance when changing filters. While two handle-portions 112 and 114 are illustrated, it will be recognized that the filter assemblies described herein may have no handles, a single handle, or more than two handles, which may be oriented in a variety of manners, such as perpendicular to the top face of the cap portion, without limitation As also illustrated in FIG. 2, the hole 118 in cap 110 can be circumscribed by an integrally- or non-integrally formed annular retaining means, such as retaining ring 116 having a general taurus-like (donut) shape of such a size, shape and internal diameter that the ball or end flange on the leading end of mounting shaft on a vacuum's filter cage can be forced up and through the hole 118 as will be discussed in more detail below, so as to retain a filter assembly of the present disclosure on the filter cage and seated against the base of the vacuum appliance. If retaining ring 116 is integral, it will be formed into cap 110 as part of the manufacturing process. In the event that ring 116 is non-integral and is a separate element of the filter assembly, it may be attached to the top surface 111 through any number of appropriate chemical (e.g., glue) or mechanical methods, without limitation.

Figure 3:
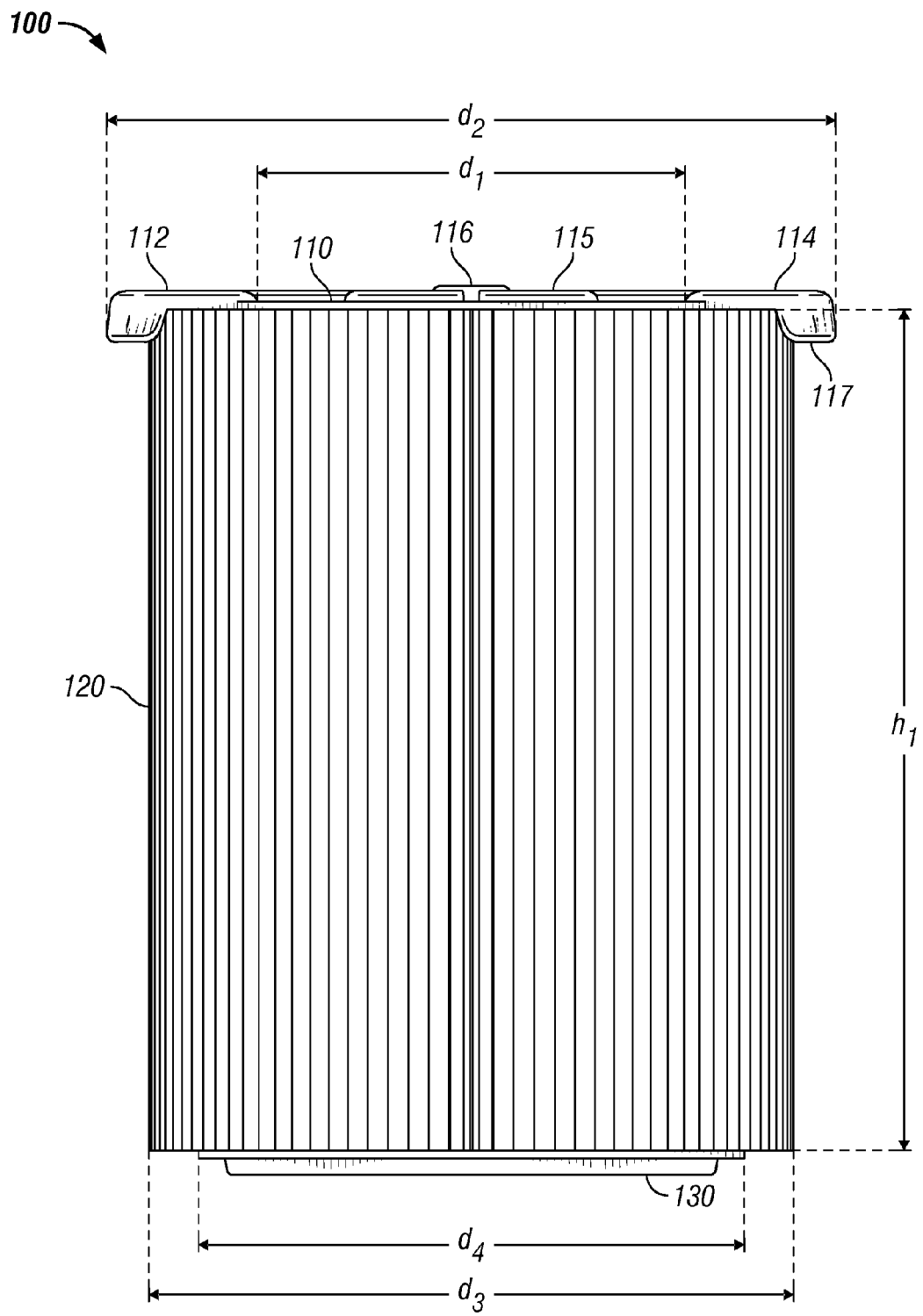
FIG. 3 illustrates a side elevational view of the vacuum filter of FIG. 2.

FIG. 3 illustrates a side view of filter assembly 100, showing in particular the dimensional relationships between the integrated cap 110, the filter 120, and the end ring 130. As shown therein, in one non-limiting, exemplary aspect of the disclosure, the integrated top mounting cap 110 has an outer diameter $d_1$ which is equal in all orientations, due the substantially circular shape of cap 110. Filter 120, which is integrally attached to cap 110, has an outer diameter $d_3$. In accordance with this non-limiting, exemplary aspect of the present disclosure, the outer diameter $d_3$ of filter 120 can be greater than the outer diameter $d_1$ of cap 110. As illustrated, only the formed handles 112, 114 extend outwardly in such a manner as to extend over the outer edge of filter 120, such that the diameter $d_2$ between the outer edges of the handles is greater than the outer diameter $d_3$ of filter 120. However, viewing FIG. 2 in combination with FIG. 3, it will be noted that in accordance with certain aspects of the disclosure, the major portion of cap 110 circumscribes the top end of filter 120, such that more than 50% of the outer diameter $d_1$ of cap 110 is less than outer diameter $d_3$ of filter 120. In accordance with exemplary, non-limiting aspects of the present disclosure, the diameter $d_1$ of greater than 50% of the cap 110 to the outer diameter $d_3$ of filter 120 has a ratio ranging from about 1.0:1.1 to about 1.0:2.0, inclusive, preferably ranging from about 1.0:1.1 to about 1.0:1.5, or further preferably ranging from about 1.0:1.2 to about 1.0:1.4. Additionally, and by way of non-limiting example only, the ratio between outer diameter $d_1$ and the height $h_1$ of filter 120 may be in ratio ranging from about 1.0:1.3 to about 1.0:1.8, preferably from about 1.0:1.4 to about 1.0:1.6. Finally, as illustrated in FIG. 3, the integrally-formed end ring 130 has an outer diameter $d_4$ that is less than the outer diameter $d_3$ of filter 120, and is substantially equal to the outer diameter $d_1$ of cap 110. In an exemplary, non-limiting aspect, a filter assembly 100 may have a filter height $h_1$ of about 8.25 inches, a filter outer diameter $d_3$ of about 6.5 inches, and cap 110 and end ring 130 diameters of about 5.38 inches, with the diameter $d_2$ spanning handle portions 112, 114 being about 7.5 inches. As indicated above, however, these dimensional relationships are not limiting, and it is equally acceptable for the cap 110 and/or end ring 130 to have an outer diameter greater than that of the outer diameter of the filter 120, or alternatively substantially equal to the outer diameter of the filter 120. Additionally, in accordance with certain aspects of the present disclosure, annular end ring 130 need not be included in the filter assembly in order to provide support at the bottom end of the filter, or to aid in providing a sealing surface against the motor housing of a vacuum appliance. In such instances, support for the filter assembly may be accomplished through the inclusion of an internal support web or mesh, such as a metal mesh support assembly (not shown), which circumscribes the interior region of the filter 120.

Figure 4:
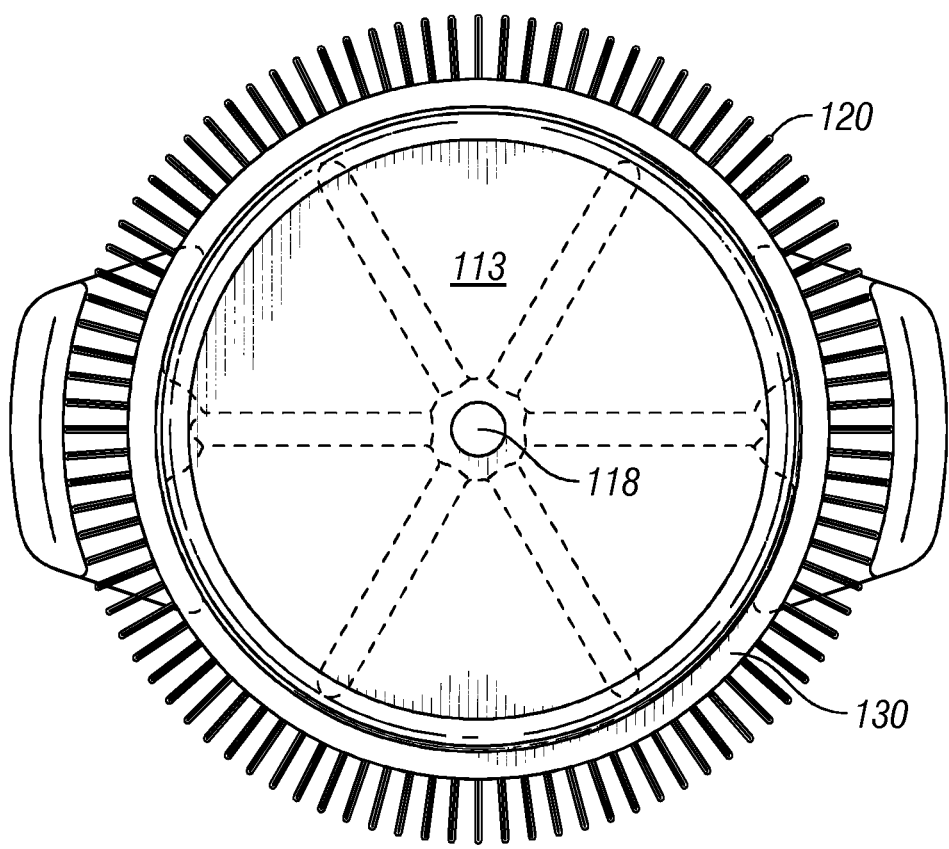
FIG. 4 illustrates a bottom view of the exemplary vacuum filter of FIG. 2.

In FIG. 4, a bottom view of the vacuum filter assembly of FIG. 2 of the present disclosure is shown. As seen in the figure, hole 118 extends through annular retaining ring 116 on the top surface 111 of cap 110 to bottom face 113 of cap 110. FIG. 4 also illustrates the closed, interior path of filter 100 formed by the circumferential path of filter 120. This interior path is the portion of the filter assembly which, in typical use, is fit over the filter cage of a vacuum appliance, whereupon the leading end of the mounting shaft extends up and through central hole 118, as will be described in more detail with reference to FIG. 6 and FIG. 7.

Figure 5:
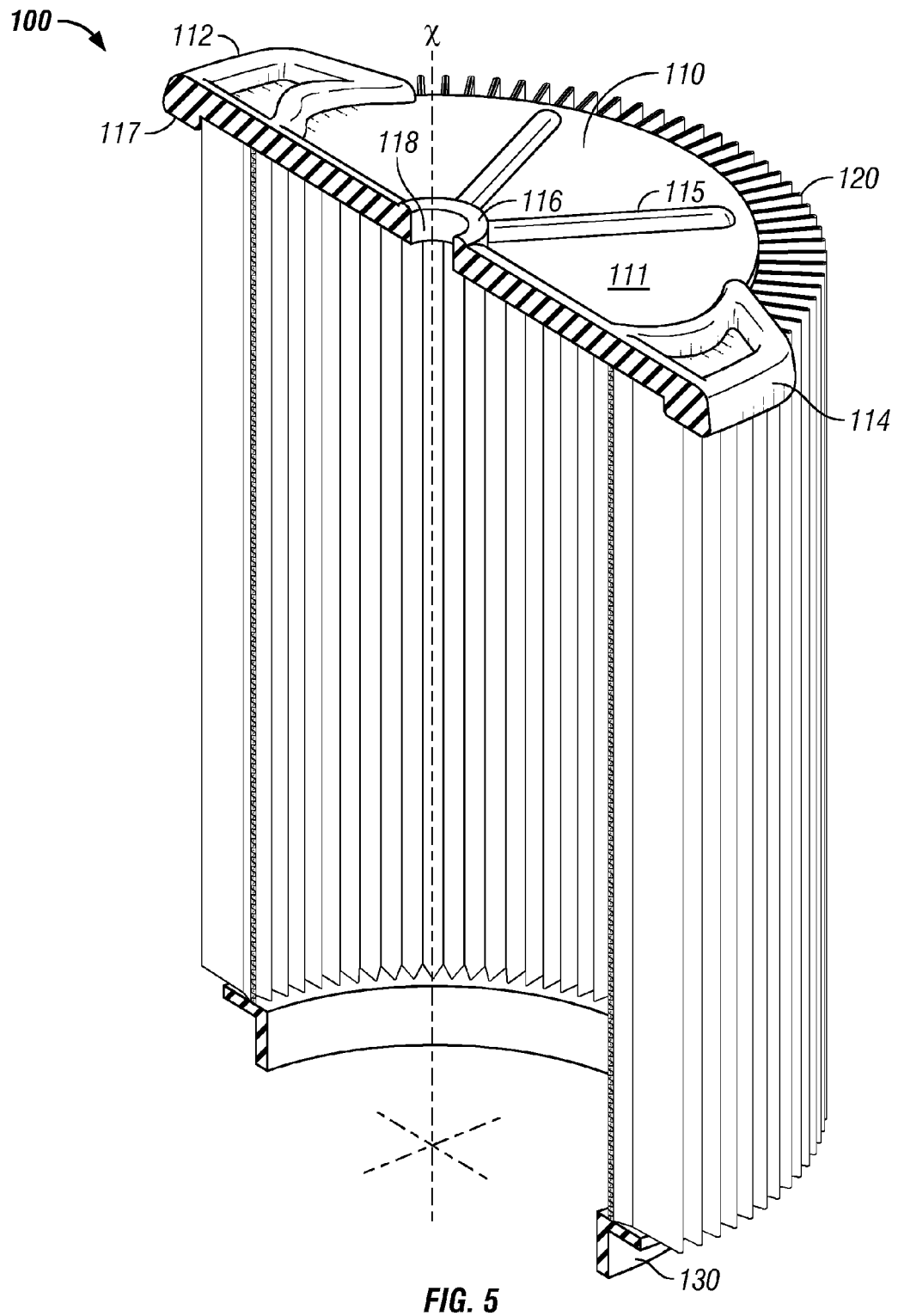
FIG. 5 illustrates a perspective cross-sectional view of the filter of FIG. 2, taken along line 5-5.

FIG. 5 illustrates a perspective cross-sectional view of an exemplary filter 100 of the present disclosure as illustrated in FIG. 2, taken along line 5-5, and showing the filter seals, filter element, and cap 110. As is more clearly seen in this view, the outer edges of the filter element 120 extend past the outer edge, or diameter, of both the integrated end cap 110 and the annular end ring 130, save for portions of handles 112 and 114 integrally formed with end cap 110, which have a lip 117 to enhance the grip for the user and which extends a distance down and over the outer edge of the filter element 120. The plurality of integrally-formed support struts 115 on the top surface 111 of cap 110 act to add strength to the end cap 110 and provide additional mechanical support to the filter assembly during typical operation and assembly in combination with a filter cage of a vacuum appliance, which will be described in more detail below.

Figure 6:
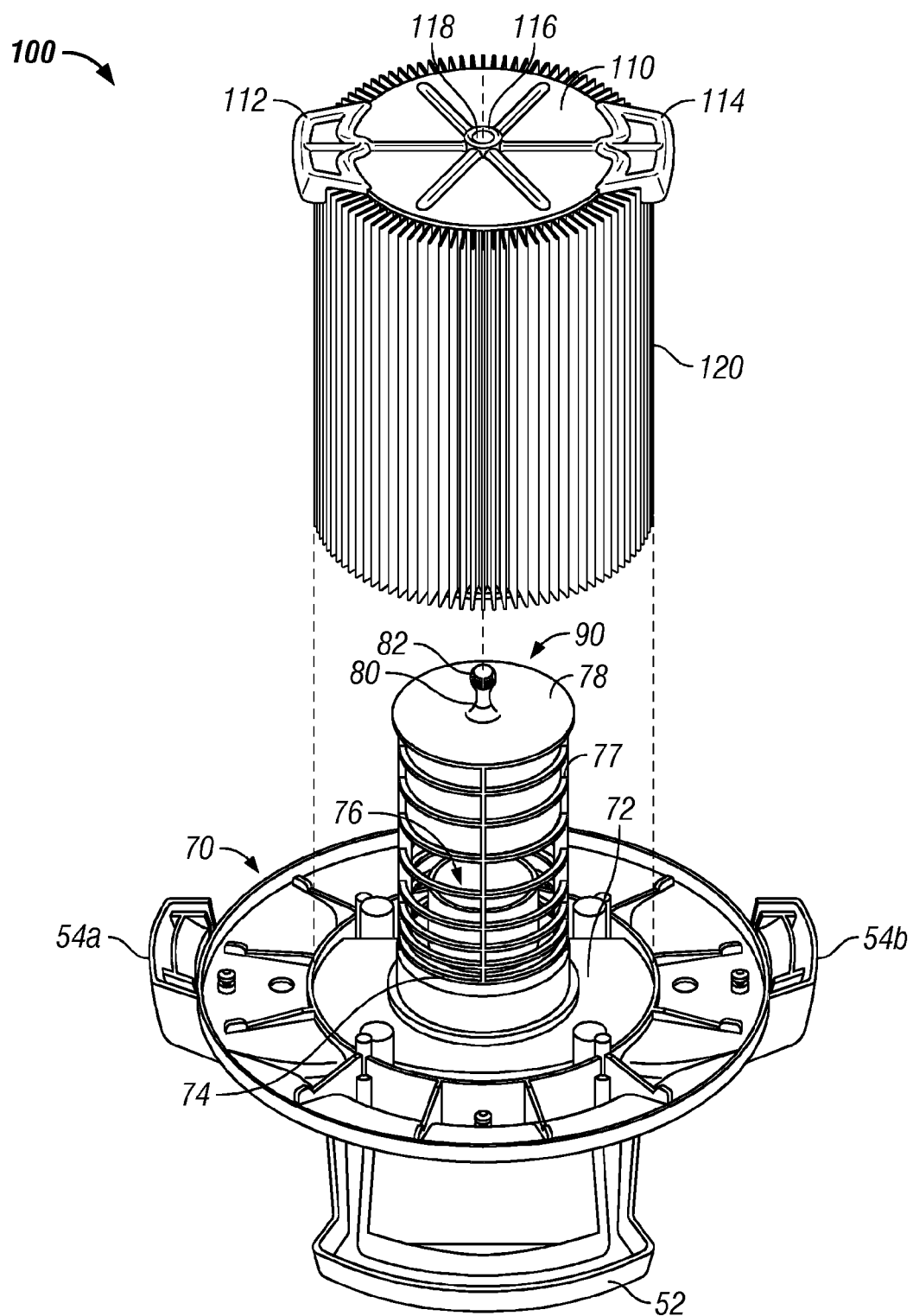
FIG. 6 illustrates a perspective view of an exemplary filter according to one embodiment of the present disclosure, shown in exploded orientation above a suction unit of a conventional wet/dry vacuum.

The end cap 110, as well as the integrated end ring 130, may be made from any conventional rigid or semi-rigid material having a flexibility great enough to go over the "ball" or equivalent shaped structure 82 on the leading end of the stem 80 of the filter cage 90 and form a seal, as illustrated in FIG. 6, including but not limited to plastics and polymers such as polyvinyl chloride (PVC), metals such as steel, and elastomeric materials that are suitable for absorbing energy and forming a retaining seal, particularly under vacuum conditions, such materials including but not limited to polyurethane elastomers and the like. The term "elastomer", or "elastomeric", as used herein, refers generally to compositions or materials that have a glass transition temperature, $T_g$, at which there is an increase in the thermal expansion coefficient, and includes both amorphous polymer elastomers and thermoplastics. Specifically preferred for use herein are elastomers which have low $T_g$'s, e.g., below 600° F. (315.5° C.), densities (or specific gravities) less than about 50 lb/ft$^3$, and tensile strengths ranging from about 10 PSI (about 68,947.572 Pa) to greater than about 100 PSI (about 689,475.728 Pa). This includes but is not limited to polyolefin elastomers, polyurea elastomers, polyurethane elastomers, latexes, and thermoplastic compounds/elastomers. As used herein, the term "elastomer" or "elastomeric compound" may also include silicone- or silica-based elastomers, or silicone-containing elastomers or rubbers. Exemplary elastomers and rubbers compounds which may be used in forming the filter assemblies described herein include but are not limited to acrylonitrile-butadiene rubbers (NBR) such as Buna-N, hydrogenated nitrile rubbers, ethylene-propylene elastomers, fluorocarbon rubbers such as VITON®, chloroprenes, silicone rubbers and elastomers, fluorosilicone rubbers and elastomers, polyacrylate elastomers, ethylene acrylic elastomers, styrene-butadiene rubbers (SBR), polyurethanes including both polyester and polyether urethanes, and natural rubbers (NR).

In particular, in accordance with one aspect of the present disclosure, the end cap 110 and the end ring 130 are comprised of an elastomeric material, preferably a polyurethane foam, and more particularly it is two-part polyurethane foam, such as those two-part polyurethane foams that comprise a mixture of an isocyanate and a resin. In accordance with certain aspects of the present disclosure, the two-part polyurethane foam may be made of the Elastoflex™ material manufactured by BASF Corporation of Livonia, Mich. Exemplary, non-limiting two-part polyurethane foams have a mix ratio of between about 1:1 and about 3:1, resin to isocyanate, this ratio being inclusive. Suitable, alternative elastomers which may be used to form one or both of the cap 110 and the end ring 130 include but are not limited to polyurethane (commercial example including Lupranat®, Lupranol®, Lupraphen®, Elastoflex®, and Cellasto®), expandable polystyrene (EPS; commercial examples including Styropor® and Neopor®, both expandable polystyrene (EPS) materials available from BASF), extruded polystyrene (XPS; commercial examples including Styrodur® C or Peripor® from BASF), melamine resin (such as Basotect®), or polypropylene (such as Neopolen P®).

The elastomeric materials used to manufacture both the integrated end cap 110 and the integrated end ring 130 are preferably of the same type, and further have a variety of physical and mechanical properties that allows the overall filter assemblies disclosed herein to perform in the advantageous manner described. Exemplary characteristics of the material include density, tear resistance, elongation, set compression, shore "A" hardness, tensile strength, hardness, static modulus, and resistance to a number of organic solvents due to the crosslinking structure of the elastomeric material, among other features. Exemplary, non-limiting physical and mechanical property ranges are shown in Table 1, as well as exemplary (non-limiting) measurement standards which may be used to obtain data for the listed physical and/or mechanical properties of the elastomeric materials. In accordance with the present disclosure, the elastomeric materials used to form both the integrated end cap 110 and the end ring 130 may have two or more physical characteristics or properties as set forth in Table 1, such as tensile strength, elongation, and closed cell content.

TABLE 1

Physical and Mechanical Characteristics of elastomeric materials suitable for use in forming portions of filter assemblies of the present disclosure.

| Physical/<br>Mechanical Property | Measurement Standard | Exemplary<br>Range Values[1] |
| --- | --- | --- |
| Density | ASTM D1564, D1622 | 16-25 lb/ft$^2$ |
| Tensile Strength[3] | ASTM D1564, D412 | 150-220 psi |
| Elongation | ASTM D1564, D412 | 90-200% |
| Tear Resistance, Die "C" (PLI) | ASTM D624-00 (2007) | 20-40 |
| Compression Set | ASTM D1564/D3576 | 11-70% |
| Shore "A" Hardness (free rise molded) | ISO 7619<br>ASTM D1415, D2240 | 30-40 pts. |
| Closed Cell Content | ASTM D-2856 | 80-99% |
| Dielectric Strength[2] | ASTM D149-97a | 20-100 kV/in. |

[1]All value ranges temperature required by the listed test standard.
[2]Dielectric strength is the measure of the ability of an elastomer to resist current flow when voltage is applied.

TABLE 1-continued

Physical and Mechanical Characteristics of elastomeric materials suitable for use in forming portions of filter assemblies of the present disclosure.

| Physical/<br>Mechanical Property | Measurement Standard | Exemplary<br>Range Values[1] |
| --- | --- | --- |

[3]As used herein, the term "tensile strength" refers to the maximum amount of tensile stress that can be applied to the elastomeric material before it ceases to be elastic, measured in units of force per unit area (N/m$^2$ or Pa) according to ASTM-standard D-638, ASTM D-412, or ISO 37 (available from the world wide web at astm.org).

The filters, such as filter 120, suitable for use in the filter assemblies of the present disclosure may be of the pleated type as illustrated, or may be non-pleated, and may be made of any number of suitable filtration materials, including but not limited to paper; cloth; glass-fiber materials; split-fiber materials; solution-spun fibers and materials made from such fibers; felt materials; natural fiber filter material; expanded polytetrafluoroethylene (PTFE) membranes; expanded ultra high molecular weight polyethylene (PE) membranes and materials; melt-blown media, such as melt-blown polypropylene (PP) or melt-blown polyethyelene (PE); microporous open cell polymers, such as polyurethane foam; poly(ethylene terephthalate), (PET) or polyphenylene sulfide (PPS) based materials, as well as copolymer-based materials thereof; HEPA-type materials and related fiber or randomly-arranged fiber materials (high-efficiency particulate air (HEPA) filters being those filters which can remove at least 99.97% of airborne particles 0.3 micrometers (μm) in diameter) in accordance with NIOSH requirements; triboelectrified media and materials, and the like, any of which may be treated so as to be hydrophobic and/or have mold and mildew preventative characteristics. Such treatments may be especially desirable for those filter assemblies manufactured for use in wet/dry vacuum cleaners. Filter 120 may be folded or pleated, as illustrated in the figures, e.g., FIG. 2, or it may be non-folded, as appropriate. Preferably, in accordance with one aspect of the present disclosure, and regardless of which material is used to form filter 120, the filter material is folded into multiple pleats and formed into a generally cylindrical or tube-like shape having a "rippled" or "pleated" appearance, so as to increase the exposed surface area. This folding increases the area of the filter that is in contact with the airstream during vacuum appliance operation, thus effectively improving the filtration without decreasing the airflow. The filters may also have a variety of porosities, or pore size distributions, depending upon the desired air flow permeability to be achieved. Exemplary porosities include, but are not limited to, about 1 micron, about 3 micron, and about 10 microns, as well as porosities greater than or less than these values, e.g., about 0.1 microns, and about 15 microns. Such porosity values, as used herein, mean that the filter will stop at least 99% of all particles that are of the target particle size (e.g., 10 microns) or large. Porosity measurements can be by any appropriate measurement method or device, such as with a Coulter Porometer™ (Coulter Electronics, Inc., Hialeah, Fla.), or using industry standard testing methods, such as ASTM F316-03 (available from the American National Standards Institute). Such porosities result in filters according to the present invention having air flow permeabilities ranging from about 2 cfm/ft$^2$ to about 80 cfm/ft$^2$. In general, however, the filters 120 are relatively stiff and simultaneously flexible in nature in order to hold their shape, and will have a porosity as desired in order to filter dry materials, such as dust, drywall dust, dirt, fireplace ashes, and the like out of an air stream during operation of the vacuum cleaner while allowing air t flow through it to an outlet through the vacuum lid.

As indicated, the filters of the present disclosure may also optionally further comprise one or more biostatic and/or biocidal agents. Suitable biostatic or biocidal agents are typically selected to have bacteriostatic and/or fungistatic properties which may be used to treat the filters of the present disclosure and reduce biologic contamination (e.g., mycotoxin contamination) of the air passing through the vacuum appliance and using such a filter. Exemplary biostatic and/or biocidal agents which may be used for this purpose include but are not limited to 2-bromo-2-nitropropane-1,3-diol, isothiazolines, methyl or propyl or butyl parahydroxybenzoates, sorbic acid, benzoic acid and salts of these acids, phenoxy ethanol, triclosan, diclosan, dichlorophen, chlorhexidine gluconate, orthophenylphenol, quaternary biocides, orthobenzylparachlorophenol, and substituted diphenyl ethers, as well as combinations thereof. In order to enhance the application or use of such biological inhibitors, a number of additional additives may be applied to the filter, or combined with the biocidal or biostatic agents applied to the filter, including but not limited to humectants, rheological additives, and surfactants. The humectant may be selected from calcium chloride, glycerol, sorbitol, ethylene glycol, polyethylene glycol (PEG), propylene glycol, 1,3 butylene glycol, sodium sulphate, sodium chloride and sodium dioctylsulphosuccinate. The rheological additive is typically a thickening agent, a gelling agent or a viscosity modifier, and may be one or more compounds selected from sodium carboxymethylcellulose (CMC), hydroxyethylcellulose (HEC), hydroxypropylcellulose (HPC), polyethylene glycols, polypropylene glycols, polyvinyl alcohol, polyvinyl acetate (PVA), polyvinylpyrrolidone and copolymers of these, hydroxypropyl guar, xanthan gum, chitosan, acrylated copolymers, polyacrylic polymers (carbopols) and water soluble polymers, as well as combinations thereof. Preferably, the composition remains effective, in service, for periods of 6 months or more, such that the filter, after 3 months in normal use, produces at least log 1 reduction in cfu's/gram of clean filter material in comparison with an untreated filter under the same conditions.

Additionally, while the filter assemblies described herein have been illustrated and described generally with reference to a cylinder-shaped assembly, it is envisioned that these filter assemblies may be of any number of other suitable shapes, including but not limited to oval-type cylinder, conical, elliptical, square, rectangular, and hexagonal.

An exploded view of a filter assembly 100 in association with the filter cage assembly of a typical vacuum appliance is illustrated in FIG. 6, wherein the filter cage 90 forms a part of the suction unit 70 which is often an integral part of vacuum lid 50 and mounts on the top of a vacuum appliance collection drum 30 (see, FIG. 1) for collecting debris in the form of dirt, dust, saw dust, water, and other liquids. The general suction unit 70 as illustrated typically includes an opening (not shown in this view) to which a vacuum hose is attached (e.g., 60 in FIG. 1), an exhaust 74, a float ball or valve 76 as a safety precaution to turn off the suction unit 70 when a liquid fills the drum 30, and latches 54a, 54b for releasably securing the suction unit 70 to the collection drum 30. Filter cage assembly 90, as well as other filter cage assemblies described herein, comprises a first end comprising a top face (not shown), and a second end comprising a bottom face 78 opposite and spaced apart from the top face, wherein the filter cage assembly is typically attached to a motor housing or suction surface 72 of the vacuum appliance, the bottom face being available for coupling with a filter or filter assembly such as described herein. The filter cage assembly 90 extends downwardly away from and generally perpendicular to suction surface 72 of the suction unit 70, and may be mold-formed with unit 70, or may be a separately-formed assembly that is attached to and integrated with the suction unit 70 using any number of appropriate attachment means. The filter cage assembly 90 also typically comprises a plurality of energy-absorbing structural ribs 77 which form a support for the cage, and which can act to at least partially absorb impact or other stress loads applied to the cage during normal use and operation of the vacuum appliance. Ribs 77 may be formed in a parallel arrangement as illustrated, or may be oriented in a variety of other orientations while maintaining the desired structural support, such as in longitudinally angled to form a "barber-pole" type arrangement around the perimeter of the cage. Assembly 90 may also comprises a mounting post or threaded bolt 80 extending downwardly from and substantially perpendicular to the bottom face 78 of the filter cage assembly 90, the distal end of which may optionally further comprise an integrally-formed, shaped head 82 which can act to further retain the filter assembly over the filter cage assembly 90. Mounting post 80 may be substantially cylindrical in shape, or as illustrated in FIG. 6, may have an hour-glass shape, such that the base of the post slopes towards the bottom face 78 of the filter cage assembly 90, while the leading end 82 is a shaped head having a diameter greater than the diameter of the post itself. While the shaped head at leading end 82 is illustrated to be spherical in shape, it is by no means limited to such a shape, and can take any number of geometric shapes, so long as the diameter of the head is greater than the diameter of the post 80 at its narrowest point. Additionally, the hour-glass shape of the post 80 advantageously improves the seal of the filter assemblies described herein against the bottom face of the filter cage, in combination with the effect of the annular retaining ring 116. In accordance with the present disclosure, the filter assemblies described herein fit over the bottom face of the filter cage 90, wherein a portion of the mounting post 80, such as leading end 82, extends through the opening in the cap of the filter assembly and is retained in position by the elastomeric material of the cap and/or a retaining ring or means associated with the filter assembly cap 110.

When the filter assemblies of the present disclosure are constructed in the manners disclosed herein, the filter assemblies 100 (and 300, 400 and 600) have an open end opposite the integrated end cap 110 which is circumscribed by the integral end ring 130 (see FIGS. 3-5) that is adapted to tightly interface with the exhaust section of the suction unit 70 of the vacuum assembly. The filter unit assembly 100 shown in FIG. 6 includes a centrally-located annular hole/opening 118 in its integrated end cap 110, surrounded by an annular retaining ring 116 as described previously. This annular hole is preferably smaller in diameter than the leading end 82 of post 80 on the filter cage. In a typical application, the post 80 (or bolt) located on the bottom face 78 of the filter cage assembly 90 as shown is passed through the opening 118 in the end cap 110, whereupon the hole 118 in the filter assembly expands so as to go over the ball (or other formed portion) on the leading end 82 of the post 80, and then contracts again to its original size after passing over leading end 82, so as to hold the filter assembly 100 in place on the suction unit surface 72. Stated another way, the opening 118 in the end cap 110, in accordance with the present disclosure, has an uncompressed diameter smaller than the diameter of a portion of the mounting post, such that during assembly, the opening 118 expands in diameter to fit over a portion of the mounting post 80, such as leading end 82, and thereafter contracts in diameter so as to retain the filter assembly over the filter cage assembly 90. Due to the size and elastomeric characteristics of the annular retaining ring 116 detailed above, the filter unit assembly 100 is tightly retained in place over the filter cage assembly 90 without the need for additional retaining means or mechanisms, such as a nut or similar mechanical means. Upon such mounting of the filter unit assembly, the integral end ring 130 acts as a gasket element to form a tight fit against a sealing surface 72 on the suction unit 70 when the filter assemblies described herein are retained in place as illustrated and described. Additionally, during operation of a vacuum assembly, the filter seal itself is improved by the force of the vacuum which pulls the filter assembly into a tight seal against the shaped filter cage mounting post 80. In certain aspects of the present disclosure, as will be described in more detail below with reference to FIGS. 7A-7C, when the filter assembly described herein is coupled to the filter cage, the engagement of the projection, or mounting post, 80 with opening 118 can result in a deformation of the deformable material such that the cap assumes a substantially conical shape, wherein the point of the cone is such that it points either towards or away from the motor housing.

In accordance with the present disclosure, the general method of attaching a filter assembly as described herein, such as filter assembly 100 (or any of the other filter assemblies described herein), to a filter cage 90 of a wet/dry vacuum appliance comprises the steps of providing a filter cage that includes a first end and a second end and a mounting projecting extending from the second end, the mounting projection defining a mounting region; providing a filter assembly including a first end, a second end, and a mounting cap positioned at the second end of the filter, the mounting cap being at least partially formed of a deformable material and defining an opening; positioning the filter assembly about the filter cage such that the filter assembly fits over the filter cage and such that the second end of the filter assembly is positioned closer to the second end of the filter cage than to the first end of the filter cage; and deforming the mounting cap to cause the mounting projection to extend through the opening in the end cap and to cause the end cap to engage the mounting region of the mounting projection. This method is not intended to be limiting in any way, but is a general method appropriate for use with the filter assemblies and systems described herein.

Figure 7A:
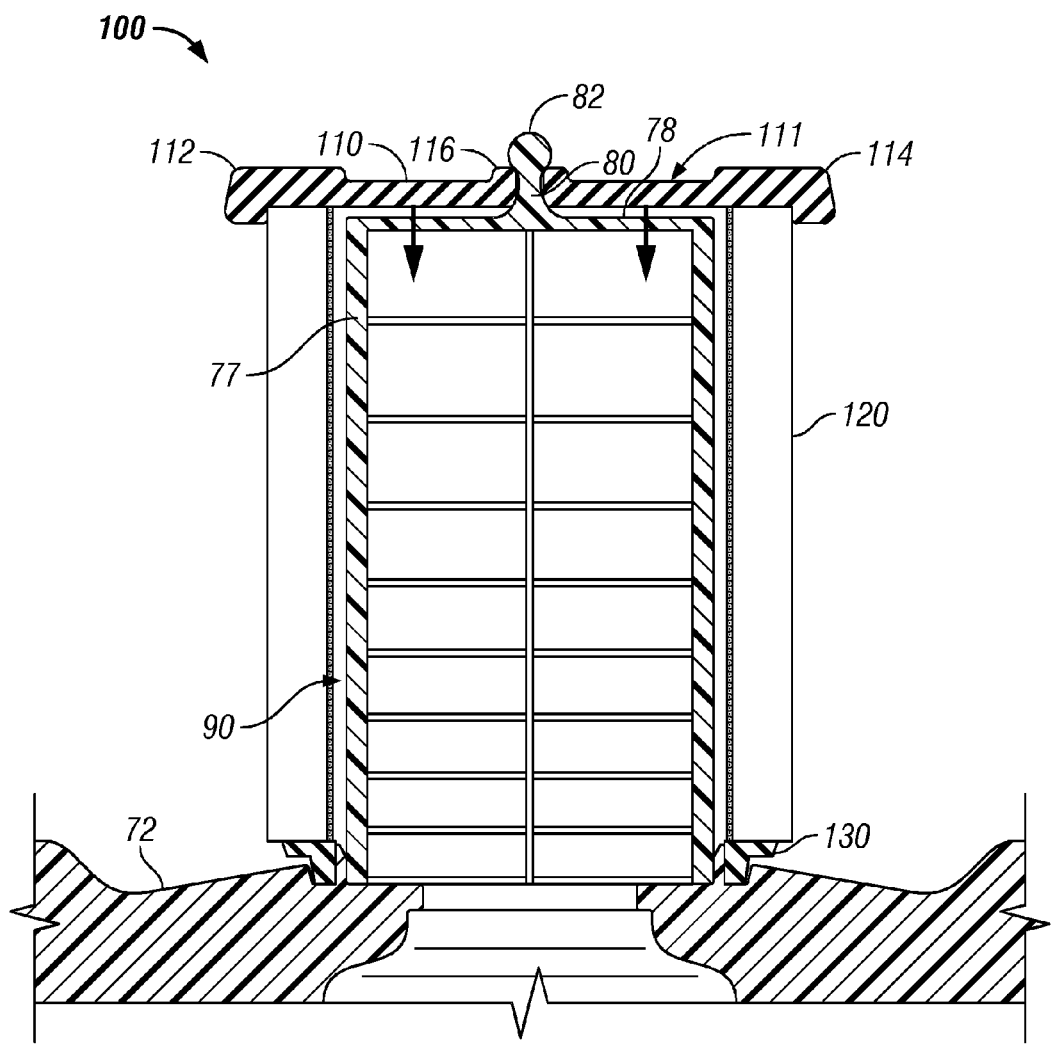
FIG. 7A illustrates a cross-sectional schematic view of an exemplary vacuum cleaner mounting assembly with a filter of the present disclosure mounted thereto.

FIG. 7A illustrates a cross-sectional schematic view of a vacuum cleaner mounting assembly with a filter assembly 100 of the present disclosure mounted thereto, such as that from the exploded view in FIG. 6. As shown therein, when filter assembly 100 is mounted over filter cage assembly 90, at least a portion of post 80 extends above the top surface 111 of cap 110 and annular retaining ring 116. In accordance with aspects of the present disclosure, in the instance where the post 80 has a formed head 82 at its leading end, the formed head 82 preferably clears the top of ring 116 and further acts to retain the filter assembly 100 over the filter cage 90 during normal operation of a vacuum appliance, such as a wet/dry vacuum cleaner. FIG. 7A also illustrates one of several acceptable manners in which end ring 130 mates with and forms a seal against sealing surface 72 of the vacuum appliances suction unit 70. The directional arrows indicate the direction of vacuum force during operation of a vacuum appliance, illustrating again the improved filter seal formed by the use of the filter assemblies described herein, wherein the force of vacuum acts to pull the filter assembly tightly against the shaped filter-cage mounting post 80. In accordance with the aspect illustrated in FIG. 7A, the engagement of mounting post 80 with opening 118 can result in very little deformation of the deformable material that forms and defines 118 or the cap of the filter assembly itself, resulting in the cap of the filter assembly assuming a shape that is substantially parallel to the bottom face 78 of the filter cage.

Figure 7B:
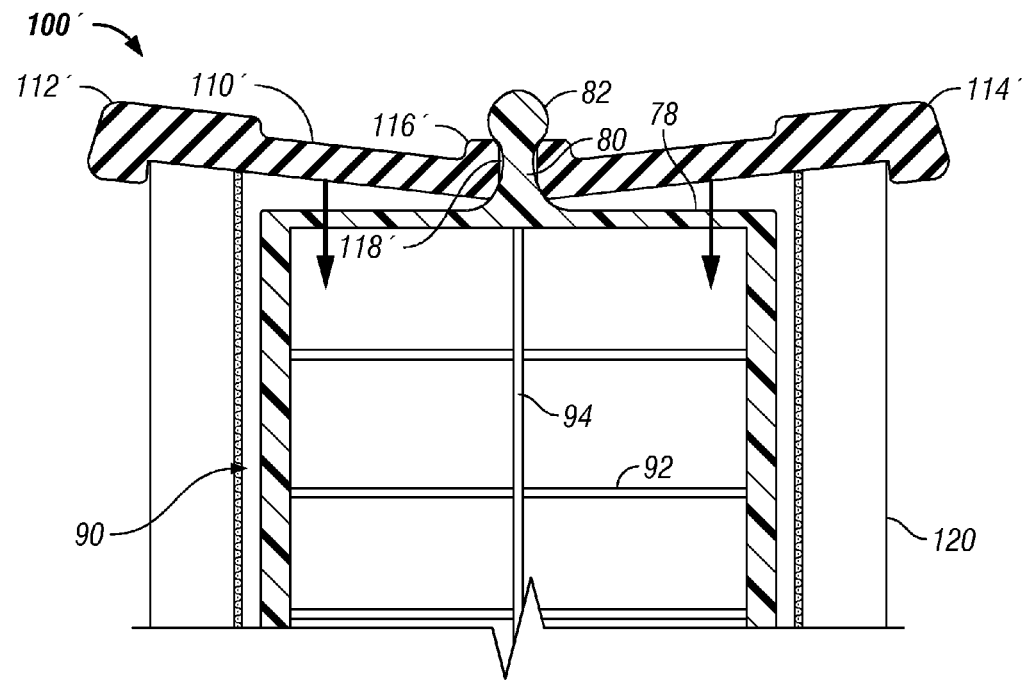
FIG. 7B illustrates a cross-sectional schematic view of an alternative vacuum cleaner mounting assembly with a filter of the present disclosure mounted thereto.

FIG. 7B illustrates a cross-sectional schematic view of an alternative vacuum cleaner mounting assembly with a filter of the present disclosure mounted thereto, wherein the surface of the cap 110' is non-planar, and conical in its manner of contact with the top surface 78 of filter cage 90. As shown therein, engagement of the mounting post/projection 80 with the opening 118' of the filter assembly causes a deformation of the deformable material the forms the cap 110' and defines the opening 118', as well as the optional retaining member 116', such that the cape assumes a substantially conical shape, the conical shape formed by the deformable material being such that the point of the cone points in a direction towards the motor housing of the vacuum appliance (not shown).

Figure 7C:
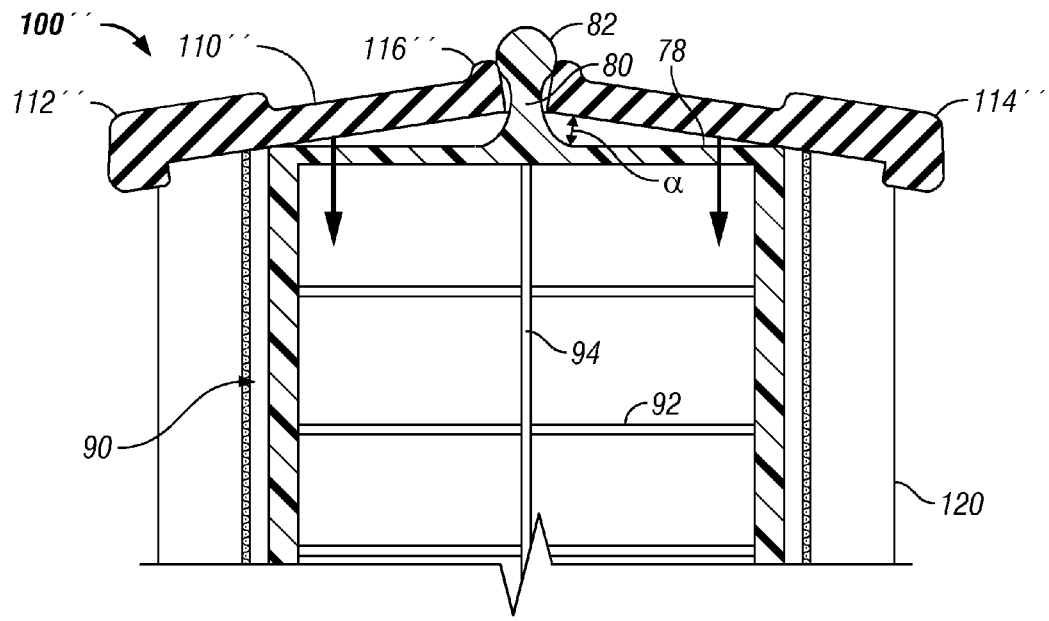
FIG. 7C illustrates a cross-sectional schematic view of a further alternative vacuum cleaner mounting assembly with a filter of the present disclosure mounted thereto.

FIG. 7C illustrates a cross-sectional schematic view of an alternative vacuum cleaner mounting assembly with a filter of the present disclosure mounted thereto, wherein the surface of the cap 110" is in a non-planar, frusto-conical contact arrangement with the top surface 78 of filter cage 90. As shown in the figure, the frusto-conical arrangement of cap 110" with the top surface 78 of the filter cage allows for a non-planar offset of some angle, $\alpha$, between the filter assembly 100" and the filter cage 90, while maintaining appropriate surface contact and seal such that vacuum may be maintained during normal operational use. As shown therein, engagement of the mounting post/projection 80 with the opening 118" of the filter assembly causes a deformation of the deformable material the forms the cap 110" and defines the opening 118", as well as the optional retaining member 116", such that the cap assumes a substantially conical shape, the conical shape formed by the deformable material being such that the point of the cone points in a direction away from the motor housing of the vacuum appliance (not shown).

Figure 8:
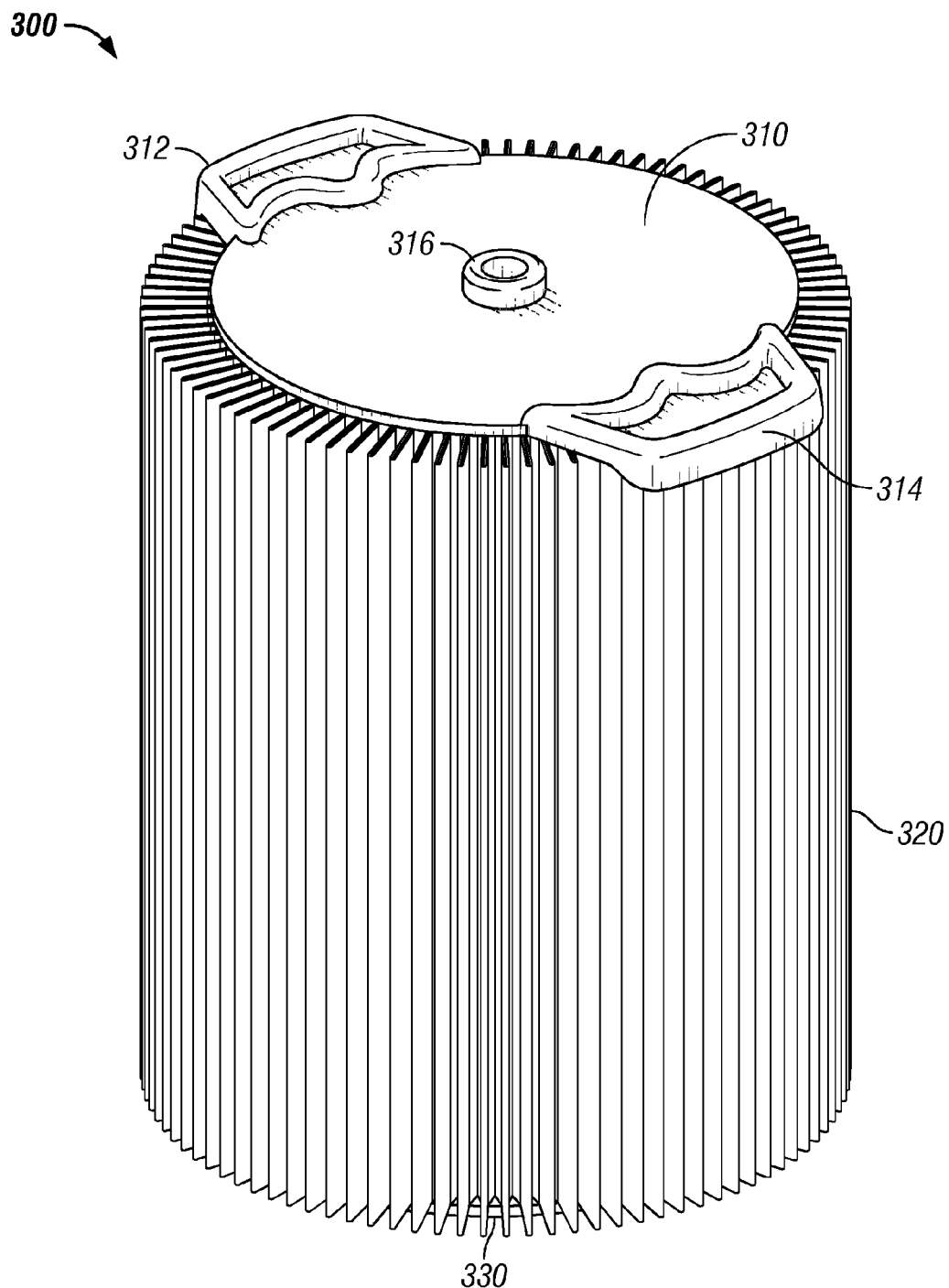
FIG. 8 illustrates a perspective view of an alternative vacuum filter assembly of the present disclosure.
Figure 9:
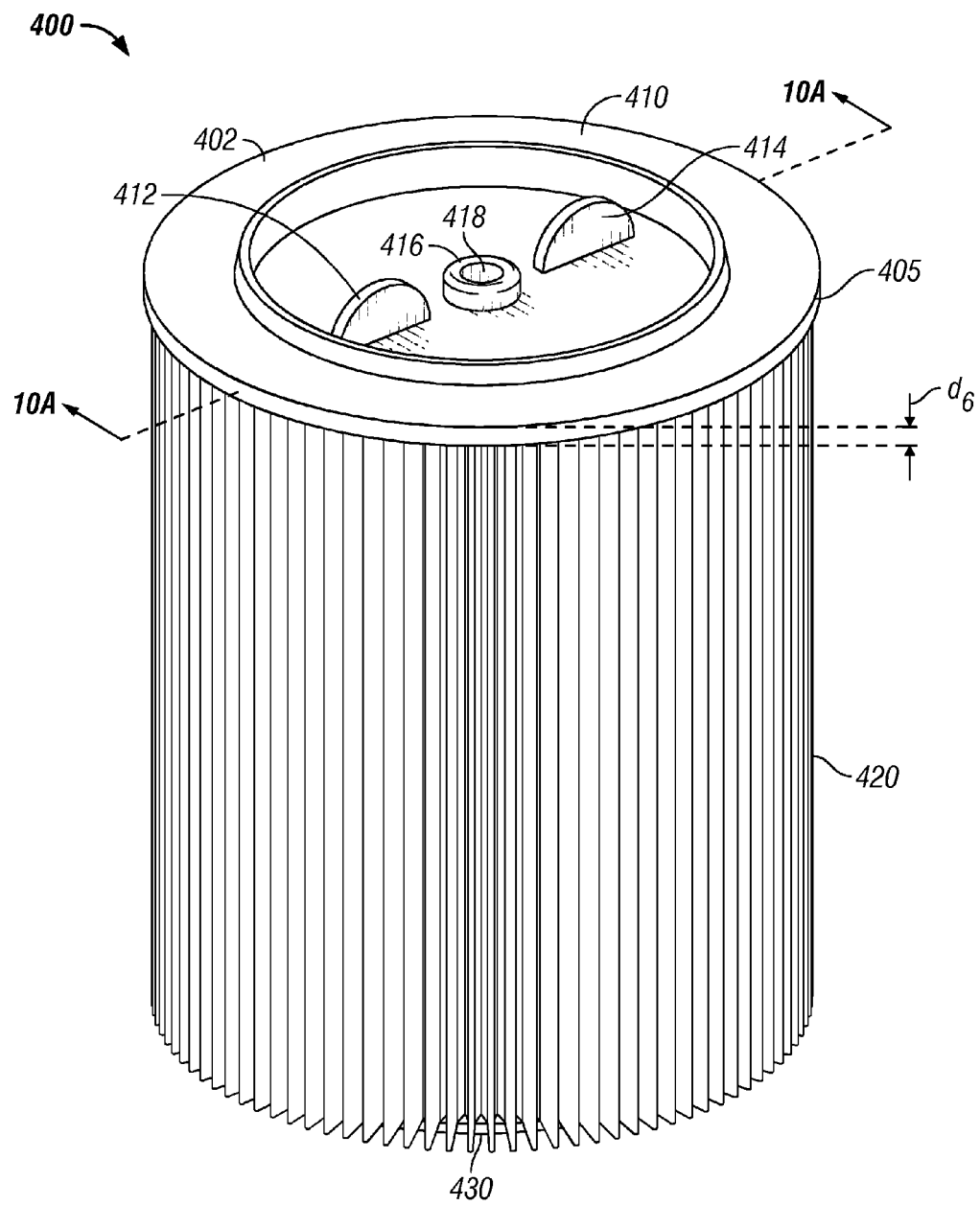
FIG. 9 illustrates a perspective view of a further alternative vacuum filter assembly of the present disclosure.

FIGS. 8-10 illustrate alternative, yet equally acceptable embodiments of the present disclosure. In FIG. 8, a filter assembly 300 is illustrated in perspective view, the assembly comprising an integrated cap section 310, an end ring 330 (not shown), and a cylindrically-shaped, pleated filter 320 intermediate between cap 310 and end ring 330. The integrated cap 310 comprises two handle portions 312, 314 and a formed hole 316 in the center of the cap. As with the filter assemblies described above, the handle portions 312 and 314 extend partially over the top and edges of the pleated filter 320, and act to allow for providing the user with a gripping surface to aid in filter removal from the filter cage of a vacuum appliance when changing filters. As illustrated in FIG. 8, the hole 316 in cap 310 is formed in a general annular, taurus-like shape of such a size, shape and internal diameter that the ball or end flange on a filter cage can be forced up and through the hole 316 so as retain the filter assembly on the filter cage and seated against the base of the vacuum appliance. As in the embodiments described above, the elasticity and physical characteristics of the material forming the cap 310, and in particular the hole 316, allows the end cap 310 to become sealed around the flange of a filter cage (not shown) after installation.

Figure 10A:
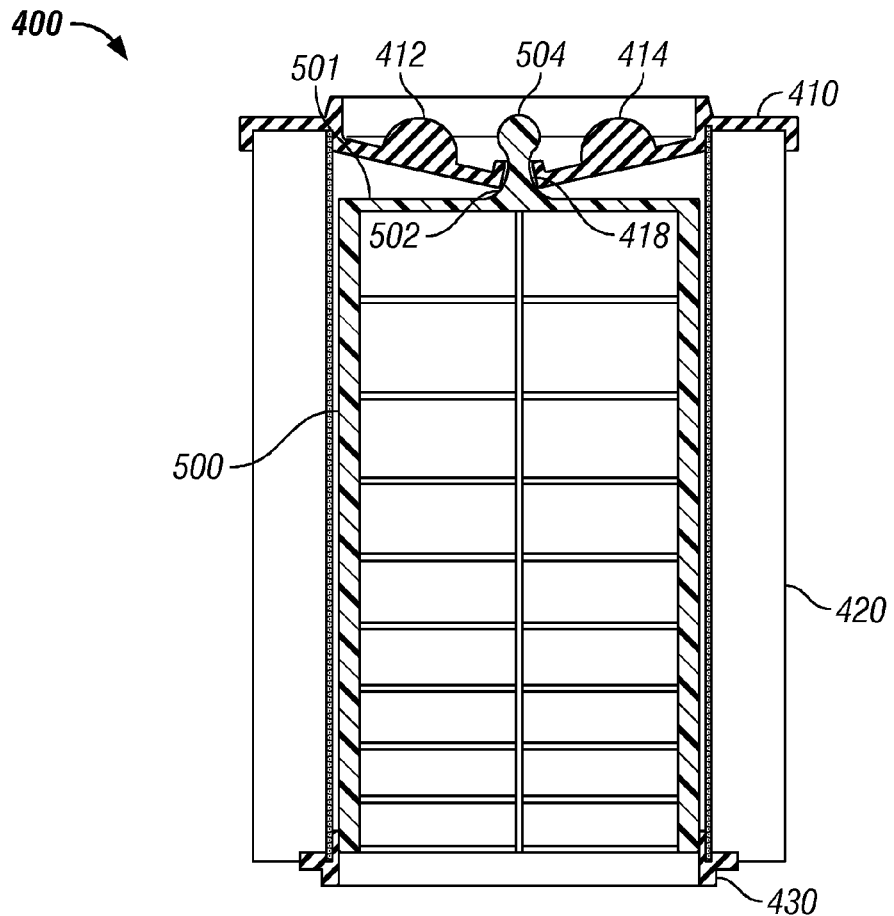
FIG. 10A illustrates a side, cross-sectional view of the filter of FIG. 9, taken along line 9-9.
Figure 10B:
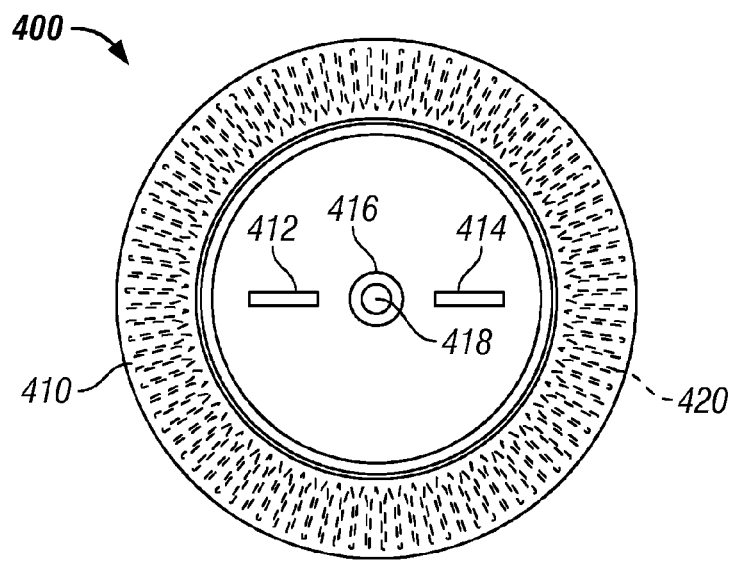
FIG. 10B illustrates a top view of the filter of FIG. 9.

FIGS. 9 and 10A-10B illustrate a further embodiment of the filter assemblies of the present disclosure. A perspective view of such a filter assembly 400 is illustrated in FIG. 9, the assembly 400 comprising a fully integrated cap 410, flanges 412 and 414, a cylindrically-shaped, pleated filter 420, and an integrated end ring 430 spaced opposite and parallel to cap 410, such that the pleated filter 420 is intermediate therebetween. Cap 410 may be made from any of the polymeric materials described above, preferably from a polyurethane such as an ELASTOPLEX® (available from B.A.S.F. Corporation) polymer or foam. Fully integrated cap 410 extends across the entire top diameter of the filter 420, and integrally retains filter 420 in part via lip 405 which is a formed part of cap 410, and which both circumscribes the outer edge of cap 410 and extends a distance $d_6$ along the outer edge of filter 420, perpendicular to the top face of cap 410. Flanges 412 and 414, as shown herein, may be of any appropriate shape and size, such that they may be gripped by the user in installing or removing the filter 400, and preferably extend upwardly from the top face 402 of cap 410. Additionally, while flanges 412 and 414 may be formed separately and attached to the top face 402 using any appropriate methods, such as through the use of adhesives, flanges 412 and 414 are preferably integrally formed with the cap 410. FIG. 10A illustrates a cut-away side view of the assembly 400 of FIG. 9, taken along line 9-9, as it appears either during removal from a vacuum filter cage 500, or alternatively, and as described above with reference to a separate filter assembly 100, engagement of the mounting post/projection 502 with the opening 418 of the filter assembly may cause a deformation of the deformable material the forms the cap 410 and defines the opening 418, such that the cap assumes a substantially conical shape, the conical shape formed by the deformable material being such that the point of the cone points in a direction towards the motor housing of the vacuum appliance. As is more clearly seen in this figure, the projection 502, integrally formed with the top face 501 of cage 500 associated with a vacuum appliance (not shown) extends through opening 418 in integrated cap 410 in a manner as described above, wherein the opening 418 has an uncompromised diameter smaller than a diameter of a portion of the projection 502, or the leading end 504 thereof, such that, during assembly, the opening 418 expands in diameter to fit over a portion of the projection 502, and thereafter contracts in diameter so as to retain the filter over the cage 500.

FIG. 10B illustrates a top-view of an alternative aspect of the filter of FIG. 9, wherein the assembly comprises an integrated, top cap 410', two (or more) upwardly extending flanges 412 and 414 formed on the top face of cap 410', a pleated filter 420, and a hole 418 formed in the center of cap 410' and surrounded by an integrally-formed, taurus-shaped retaining ring 416. Similar to the filter assemblies described above, the physical characteristics (e.g., elasticity) of the material forming the top cap 410' and/or the retaining ring 416 circumscribing the hole 418 allows the end cap 410' to seal around the flange of a filter cage after installation over a filter cage in a vacuum appliance. The aspect illustrated in FIG. 10B differs from that shown in FIG. 9 in that the cap 410' has a top diameter that is less than the diameter of the filter 420, such that the ends of filter 420 extend outwardly past the edge of cap 410'.

Figure 11:
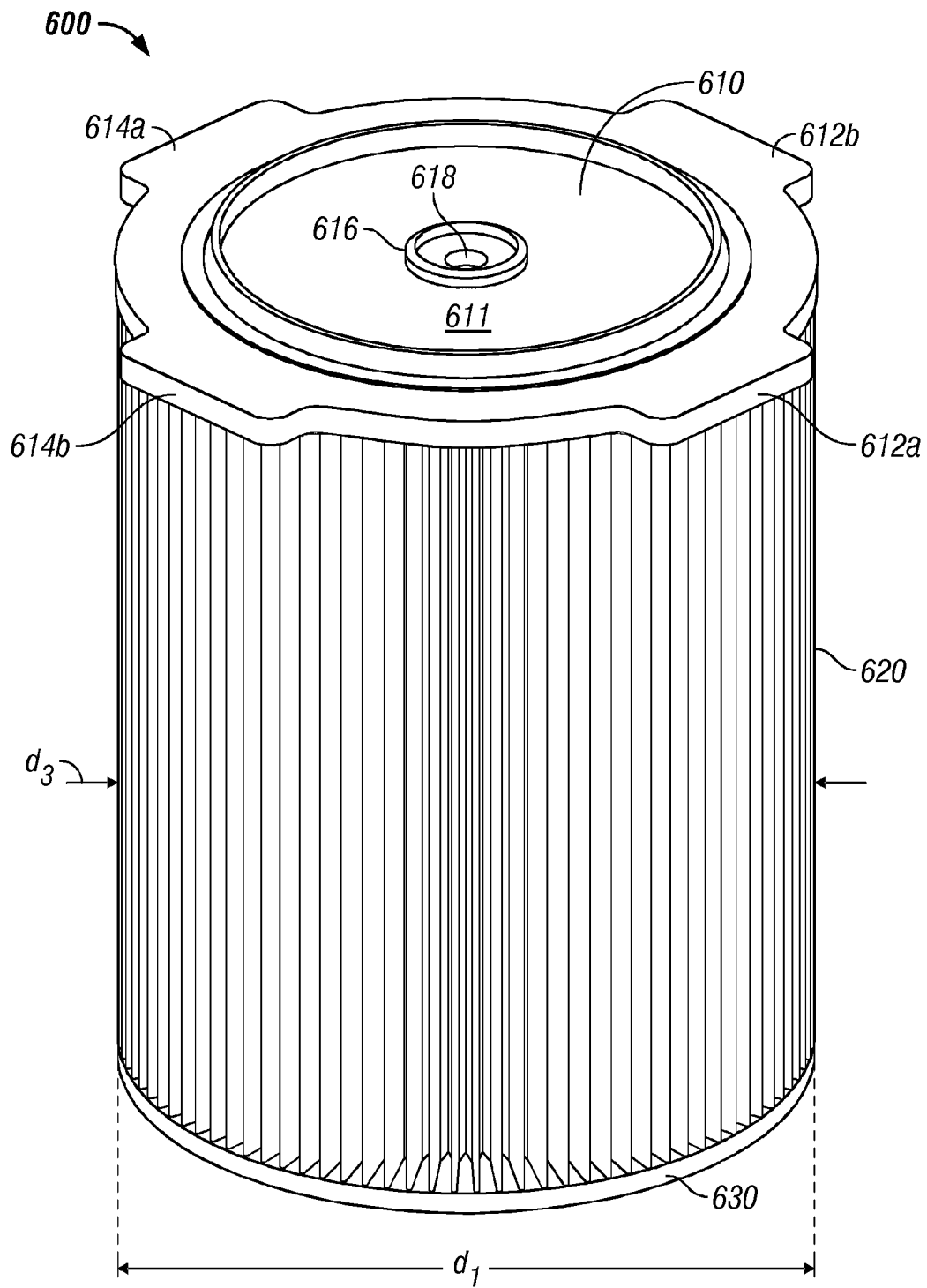
FIG. 11 illustrates a perspective view of a further alternative filter assembly of the present disclosure.

FIG. 11 illustrates a further aspect filter assembly embodiment 600 of the present disclosure, comprising a plurality of handles 612, 614. As illustrated in the figure, the assembly 600 comprises a top cap portion 610, a lower end ring 630, and a pleated filter 620 spaced intermediate between the cap 610 and the lower end ring 630, wherein the cap 610 and the end ring 630 are bonded to the filter 620. Top cap portion 610 comprises an annular hole 616 extending through its entire thickness, as well as an optional, taurus-shaped ring 618 circumscribing the annular hole 6516. As suggested in accordance with the embodiments above, ring 618 may be integrally-formed into the top face 611 of cap 610, or it may be attached by any number of other appropriate attachment methods, such as by adhesives or mechanical attachments. As illustrated in the figure, top cap 610 (and/or bottom ring 618) may have an outer dimension $d_1$ that is greater than the outer dimension $d_3$ of the filter 620, although it is equally acceptable to have an arrangement wherein $d_1$ is substantially the same as $d_3$, or wherein $d_3$ is greater than $d_1$, as discussed previously herein. As above, the top and bottom portions 610, 630 may be made of any appropriate material, such as polymeric materials including any number of plastics, metals such as steel, or elatomeric or rubber materials, provided that the materials can be bonded to the filter 620, and have a flexibility such that the cap portion 610 can fit over the ball on the leading end of the filter cage stem and form a seal, as described above. The embodiment shown in FIG. 11 comprises four handle portions 612a, 612b, 614a, 614b, which as drawn extend outwardly past the outer diameter of the filter. Although handle portions 612a, 612b are illustrated as being generally diametrically opposed to handles 614a, 614b, respectively, this is not necessary, and the plurality of handles may be non-diametrically opposed, as desired.

The filter assemblies, and systems employing such filter assemblies described herein offer several advantages over filters for vacuum appliances, especially wet/dry type vacuum cleaners, currently on the market. In particular, due to the small amount of polymeric material used in forming the filter assemblies, the presently disclosed filter assemblies are cheaper and more readily produced. Other advantages include less time to replace or clean the filter assembly, and no cumbersome mechanical attachment mechanisms are involved, thus eliminating the possibility of lost parts otherwise necessary for attachment of the filter. Additionally, the filter assemblies described herein may be readily retro-fit to existing vacuum appliances already in the market and requiring these types of filters. Finally, as indicated above, the characteristics—both physical and mechanical—of the end cap portion of the filter assemblies allows for an automatic seal of the filter assembly onto the mounting post of the filter cage of a vacuum appliance, such seal providing a secure retaining of the filter assembly during normal operation, as well as during dropping, jarring or other unexpected events.

FIGS. 12A and 12B illustrate alternative filter cage assemblies for use in association with the filter assemblies described herein, which allow for the retrofitting of existing assemblies to the instant filter assemblies (FIG. 12A), and the conversion of filter cages as described herein to allow for the use of standard filter assemblies and threaded nut retaining means (FIG. 12B), as desired. FIG. 12 A illustrates a filter cage assembly 700 comprising a top surface 790 having a threaded stem 780 extending upwardly therefrom, and a plurality of openings 791 to provide for the flow of air or other media downstream of the filter through the openings and into the mounting assembly for a vacuum, and thereafter subsequent exhaust, as is known in the art. These openings 791 are formed by one or more longitudinally angled rib members 794 that are formed at a zero or non-zero angle to the longitudinal axis of the filter cage, as well as one or more circumferential ribs 792 extending around, and substantially circumscribing the cage 700. Optionally, the outer surface of either the longitudinally angled ribs 794 or the circumferential ribs 792 may extend outward from the outer surface of the filter cage so as to allow the filter (not shown) to slide over the cage without interference from the circumferential ribs. In accordance with this embodiment, the cage assembly may comprise a separate, formed stem 750 having sloped or otherwise shaped sides and a polygonal or spherical head, as well as interior grooves 752 formed substantially central within, such as by a machining tool. Stem 750 is preferably solid, and may be made of any appropriate material, such as plastic or other suitable polymers, or a metal, as appropriate. In use, stem 750 may be simply threadably attached to stem 780 of filter cage assembly 700 via the threads on stem 780, such that it mounts substantially flush with top surface 790. In this manner, an older-style vacuum appliance may be readily adapted for use with the filter assemblies described herein.

FIG. 12B illustrates yet another alternative filter cage assembly 800 comprising a filter cage assembly 800, similar to that described in relation to FIG. 12A, and comprising a top surface 890 having a formed, polygonal stem 850 extending upwardly therefrom, and a plurality of openings 891 to provide for the flow of air or other media downstream of the filter through the openings and into the mounting assembly for a vacuum, and thereafter subsequent exhaust, as is known in the art. These openings 891 are formed by one or more longitudinally angled rib members 892 that are formed at a zero or non-zero angle to the longitudinal axis of the filter cage, as well as one or more circumferential ribs 894 extending around, and substantially circumscribing the cage 800. Optionally, the outer surface of either the longitudinally angled ribs 892 or the circumferential ribs 894 may extend outward from the outer surface of the filter cage so as to allow the filter (not shown) to slide over the cage without interference from the circumferential ribs. The assembly illustrated in FIG. 12B further comprises adapter 860 suitable for converting a filter cage assembly from those such as described herein to a standard filter cage assembly having a threaded stem. Adapter 860 is preferably a solid piece of formed, extruded, or machined material (including but not limited to plastic, polymeric materials, elastomers, metal, and the like) having two or more spaced apart sides 863, 865, a top face 862, and a bottom face 864 which in use makes contact with top surface 890 of filter cage assembly 800. The top face 862 of adapter 860 comprises a threaded stem 866. Adapter 860 further comprises a shaped, interior portion 870, formed in an appropriate shape such that in use, adapter 860 may be simply pushed downward in the direction of the arrow onto and over shaped stem 850, such that the bottom face of the adapter 864 makes contact with top face 890 of the cage.

Figure 12D:
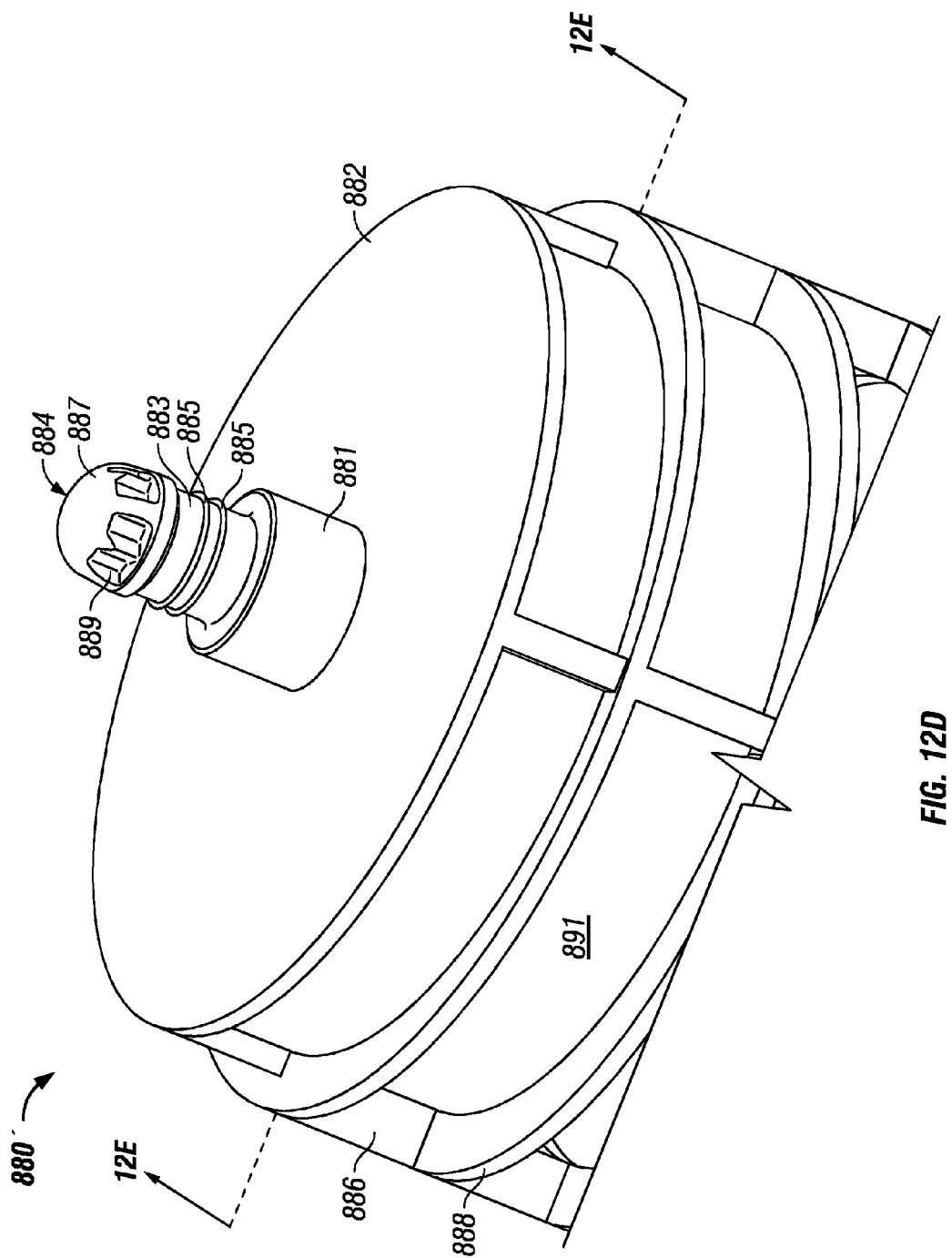
FIG. 12D illustrates a partial, perspective view of the bottom face and mounting post of an alternative filter cage assembly for use in accordance with the present disclosure.
Figure 12E:
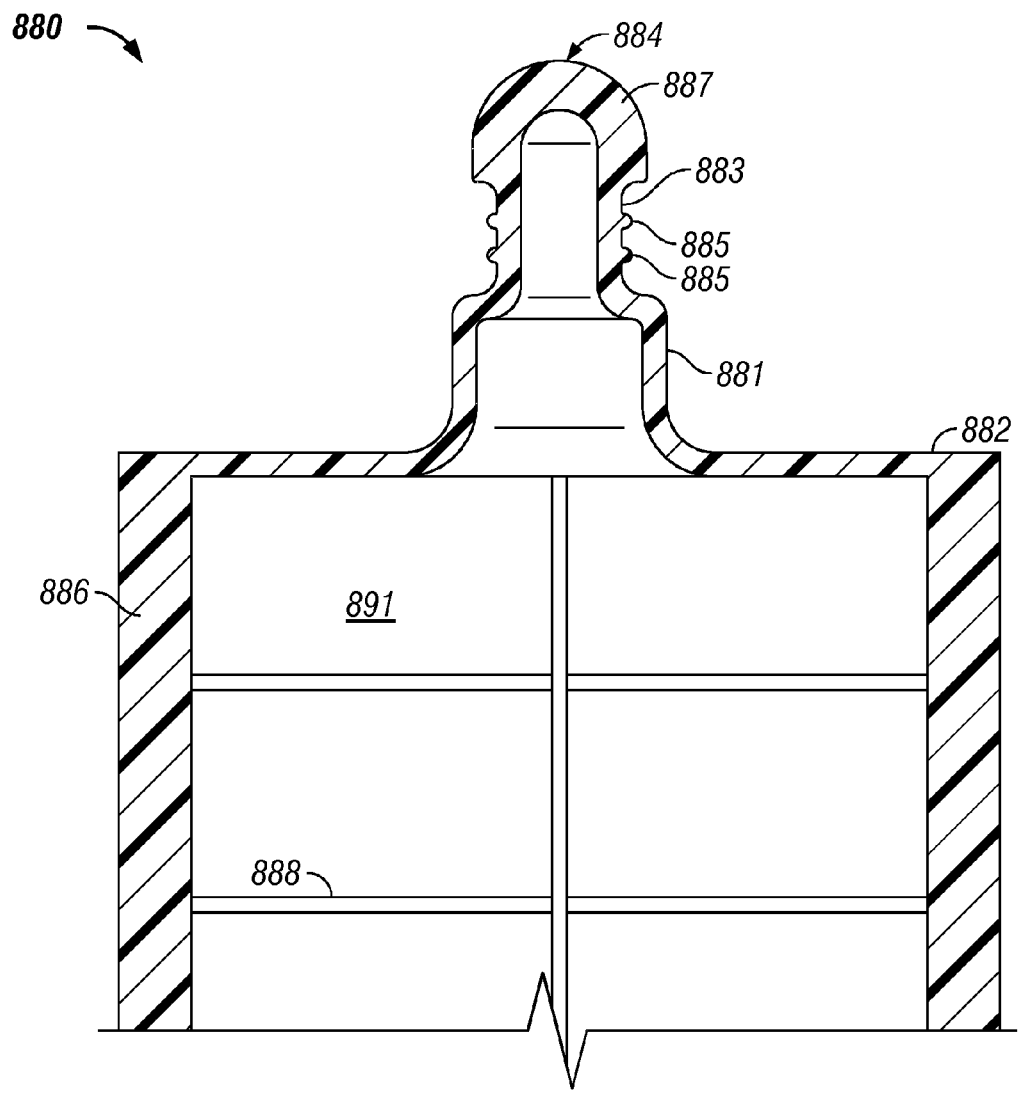
FIG. 12E illustrates a cross-sectional view of the filter cage assembly of FIG. 12D, taken along line 12-12.

FIGS. 12C-12E illustrate further, alternative filter cage assemblies 880 and 880' in accordance with aspects of the present disclosure and suitable for use in association with the filter assemblies of the present disclosure. FIG. 12C illustrates a partial perspective view of filter cage assembly 880 comprising a generally planar surface 882 of the bottom end of the cage assembly 880, having a formed projection 884, such as a mounting post or stem, extending upwardly therefrom. Projection 884 may be shaped as shown to include a neck region 883 and a head portion 887, such that neck region 883 is intermediate between the surface 882 of the cage assembly, and the head portion 887. As further shown in FIG. 12C, projection 884 may further comprise one or more outwardly-projecting ribs 885 formed into and circumscribing neck region 883, such ribs acting to further retain filter assemblies of the present disclosure when they are inserted into place over cage assembly 880 as it is associated with a vacuum appliance, such as described herein above. Cage assembly 880 also comprises one or more longitudinally angled rib members 886 that are formed at a zero or non-zero angle to the longitudinal axis of the filter cage, as well as one or more circumferential ribs 888 extending around, and substantially circumscribing the cage 800. These ribs in combination define a plurality of openings 891 as shown in the figure, which as described above provide for the flow of air or other media downstream of the filter through the openings and into the mounting assembly for a vacuum, and thereafter subsequently exhaust the air. Optionally, the outer surface of either the longitudinally angled ribs 894 or the circumferential ribs 888 may extend outward from the outer surface of the filter cage so as to allow the filter (not shown) to slide over the cage without frictional interference from the circumferential ribs.

FIG. 12D illustrates a perspective view of a further, alternative filter cage assembly 880' in accordance with aspects of the present disclosure and suitable for use in association with the filter assemblies of the present disclosure. Similar to the cage assembly 880 of FIG. 12C, assembly 880' includes a generally planar bottom surface 882, as well as longitudinal and circumferential rib members 886 and 888 (respectively) which in combination define openings 891 as discussed previously. Cage assembly 880' also comprises a formed projection 884, such as a mounting post or stem, extending outwardly away from surface 882. Projection 884 may be shaped as shown to include a shoulder region 881 elevating the projection from surface 882, neck region 883 and a head portion 887, such that neck region 883 is positioned between the shoulder region 881 of the projection 884, and the head portion 887. As also illustrated therein, neck region 883 may further comprise one or more rib members 885 circumscribing the neck region 883, and which may be useful in retaining filter assemblies in accordance with the present disclosure in place over cage 880'. The head portion 887 as illustrated in the figure may be semi-hemispherical in shape as shown, although any shape may be used as appropriate, and may also include one or more formed indents 889 which may act as grips for the user during installation and removal of a filter assembly as described herein onto and over the cage 880'. FIG. 12E is a cross-sectional view of the filter cage assembly 880' of FIG. 12D, taken along line 12-12, and illustrating more clearly the spatial relationship of the head, neck, should and rib portions of projection 884 as it extends outwardly away from the surface 882 (typically the bottom surface) of the cage.

In further aspects of the present disclosure, the center sealing assemblies described herein, comprising an annular center hole circumscribed by a collar which adds strength and provides for an elastomeric retention of the filter assembly over a filter cage of a vacuum appliance, may be provided in a separate element apart from the filter itself. In example, a filter assembly may comprise a first portion and a second portion, wherein the first portion comprises a shaped filter, optionally further comprising an end ring for sealingly engaging with the inner face of a vacuum motor mount. In accordance with this aspect, the second portion may comprise a separate cap portion having a centrally located annular hole extending therethrough and a retaining ring or collar circumscribing the annular hole. During use, the first portion comprising the filter would be placed over the filter cage of the vacuum assembly, whereafter the separate, second portion would then be placed over the top of the first filter portion, such that the mounting stem or post on the bottom face of the filter cage extends through the annular hole in the cap portion in a manner as described previously herein. That is, the annular hole preferably has a diameter that is smaller than the diameter at least a portion of the mounting post, for example a diameter of the leading end of the mounting stem or post on the filter cage, (which may or may not be hour-glass shaped), such that as the second portion is pushed over at least a portion of the mounting stem, the annular hole expands to go over the stem, and then contracts back to its original diameter as the second portion seals against the bottom face of the filter cage, thereby sealably engaging the first filter portion against the lower part of the vacuum head. In accordance with this aspect, similar to aspects described above, the retaining ring or collar on the second portion can aid in holding the second portion in place against the first filter portion by constricting against the mounting stem.

Figure 13A:
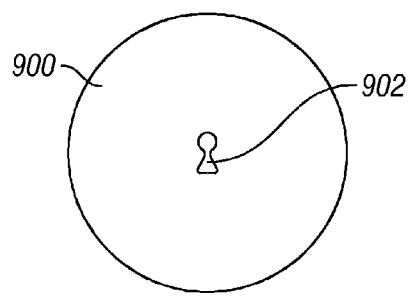
FIGS. 13A-E illustrate various alternative embodiments of the present disclosure.
Figure 13B:
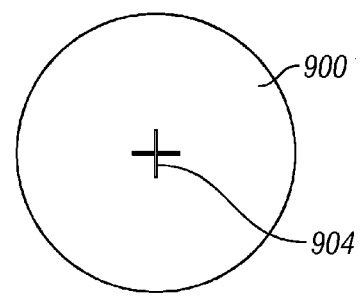
Figure 13C:
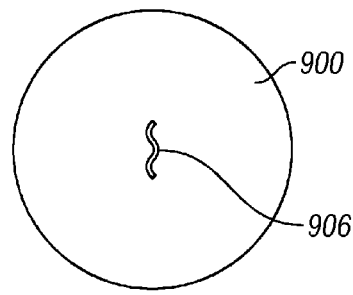

Several of the above-described embodiments of the present disclosure are illustrated generally in FIGS. 13A-13E. FIGS. 13A, 13B and 13C illustrate top views of a cap section 900, 900', and 900", respectively, each having a differently shaped hole, orifice, or opening (902, 904, 906) within and extending through, the cap sections. For example, in FIG. 13A, opening 902 is generally keyhole-shaped, and optionally off-center, such that in use the stem of the filter cage assembly may come up and through the opening 902, after which the entire filter assembly is shifted in such a manner as to lockably engage the stem of the filter cage and the filter assembly, thus making the use of a retaining ring as described herein optional or unnecessary. In FIG. 13A, opening 904 is a plurality (2 or more) of slits in the cap section 900', which allow for the stem of the filter cage assembly to extend up and through the top cap section of the filter assembly, while still allowing for the formation of a suitable seal of the filter assembly against the filter cage. Similarly, in FIG. 13C, cap section 900" comprises a single slit 906 extending through a portion of the cap 900", and which allows the stem of a filter cage to extend up and through the cap section 900" of a filter assembly of the present disclosure. Advantageously, the embodiment illustrated in FIG. 13C allows for the use of filters such as described herein with a range of different vacuum appliances having differently-placed and shaped filter cages. While integrally-formed handles and support members, such as described above, are not included in these figures for purposes of clarity, their optional inclusion with these embodiments is contemplated as described herein.

Figure 13D:
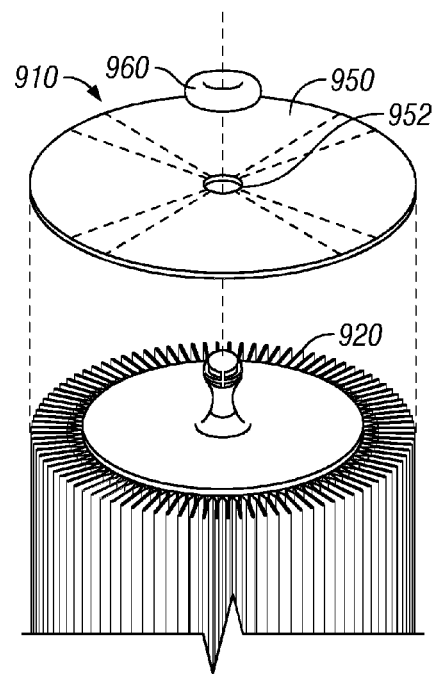

In FIG. 13D, a partial perspective view of an alternative embodiment of a filter assembly in accordance with the present disclosure is illustrated, which comprises a cap section 910, an end ring 930 (not shown), and, a generally cylindrically-shaped, pleated filter 920 intermediate between cap 910 and end ring 130 and extending in a closed, circumferential path and which includes a closed, interior path. The cap 910 may further, optionally comprise a formed hole 952 in the center of the cap, centrally-formed opening 952 extending from the top surface 950 of cap 910 through the cap to the closed, interior airflow path formed by filter 120. While opening 952 is illustrated to be substantially annular herein, it is contemplated that it may of any number of shapes and styles, as described herein. As also illustrated in FIG. 13D, the filter assembly may comprise a separate retaining member 960 for use with retaining the filter assembly in association with a filter cage of a vacuum assembly. In general, it is envisioned that in use, the filter 920 would be placed over the filter cage of a vacuum appliance (not shown), cap 910 would then be placed over the top of the filter, such that the stem of the filter cage extends up and through opening 952, after which retaining member 960 would be slid down and over the stem, and hold the assembly in place. In accordance with the present disclosure, it is envisioned that the cap 110 may also optionally comprise a plurality of integrally-formed support struts (illustrated in hashed lines), to add structural integrity to the cap section 910, as well as one or more optional handles (not shown).

Figure 13E:
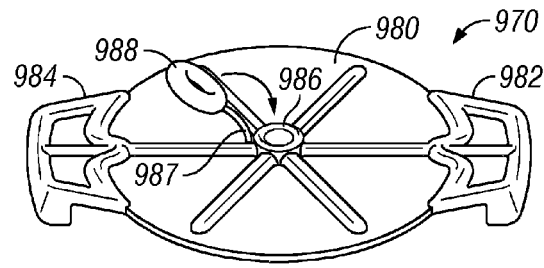

FIG. 13E illustrates a further embodiment of the present disclosure, similar to that shown in FIG. 13D, but wherein the retaining member 988 is connected to the top face 980 of cap 970 by a flexible member 987, which may be made of the same, or different, material as that which the cap 970 itself is made from. In use, once the filter assembly has been placed over the filter cage of the vacuum appliance, such that the stem of the filter cage extends upward through opening 986, the user may then extend retaining member 988, via flexible member 987, up and over the stem, so as to hold the entire filter assembly in place. Advantageously, this embodiment allows for the use of an optional filter retaining member 988 which is directly connected to the top face 980 of the filter cap 970, and which can be used or not used, depending upon the specific vacuum appliance with which the assembly is being associated. Similar to the caps described herein above, cap 970 may optionally comprise one or more integrally-formed support struts (illustrated in hashed lines), in order to add structural strength and integrity to the cap section 970, as well as one or more optional handles 982, 984, as appropriate.

Figure 14A:
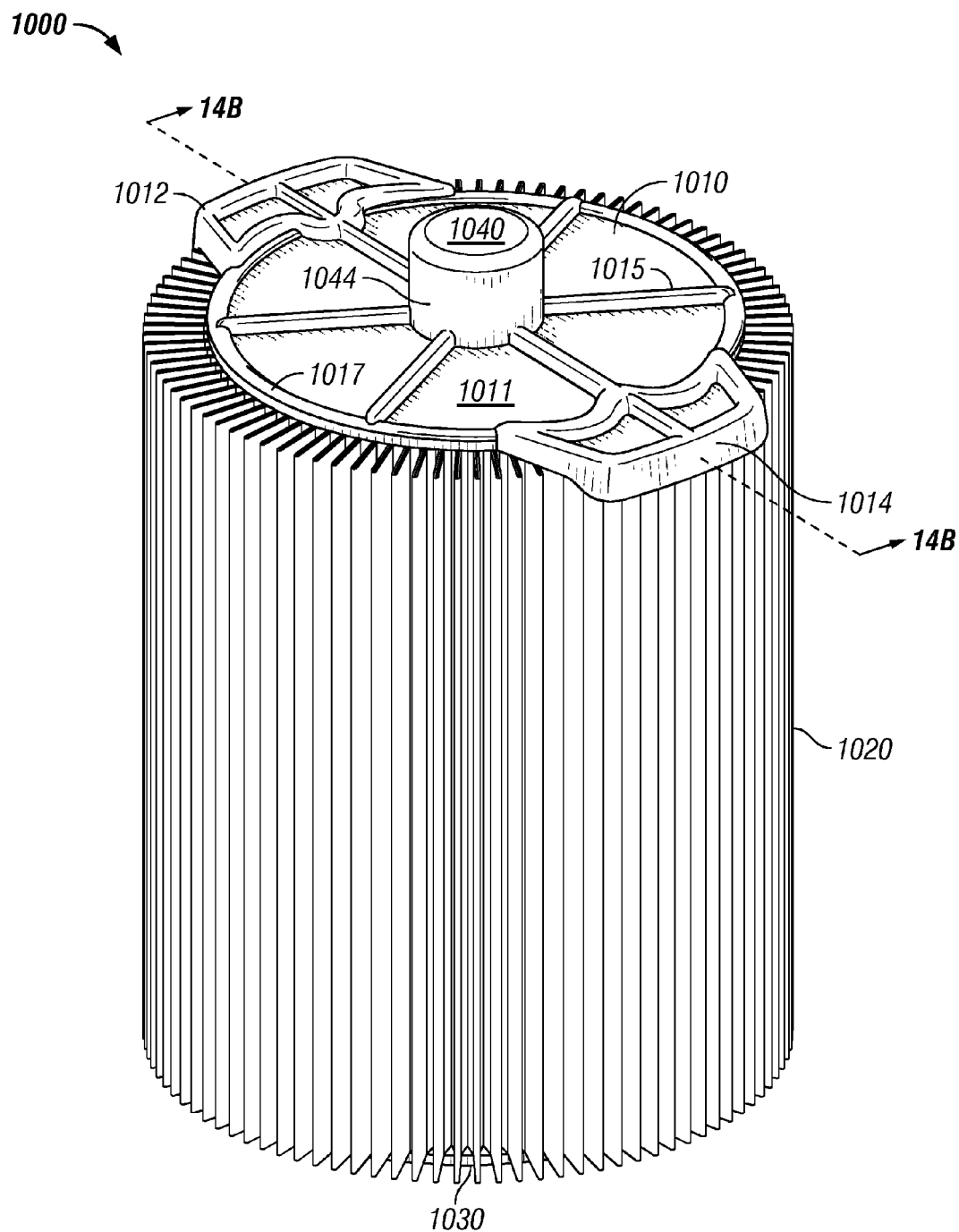
FIG. 14A illustrates a further filter assembly in accordance with the present disclosure.
Figure 14B:
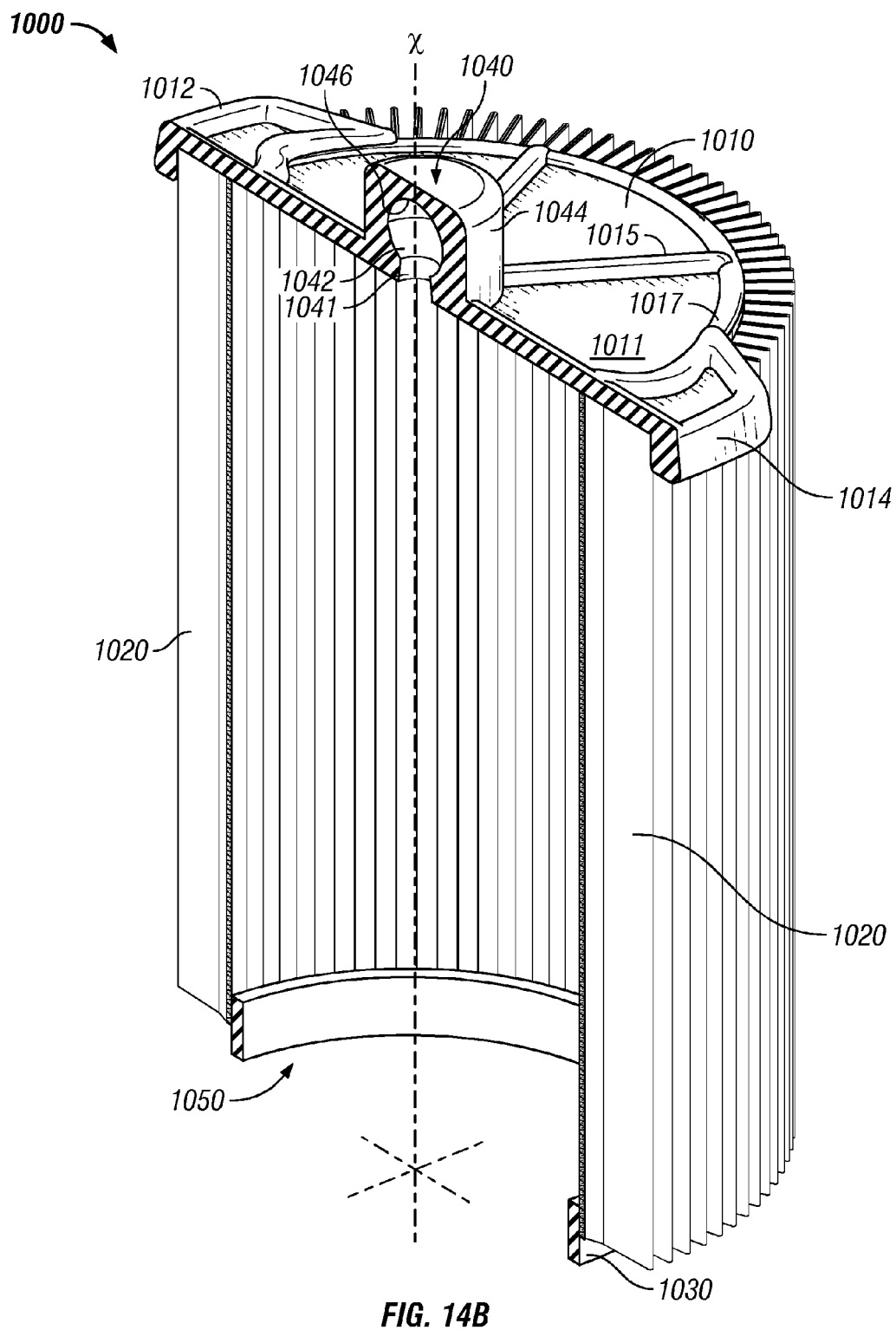
FIG. 14B illustrates a cross-sectional view of the filter assembly of FIG. 14A, taken along line 14-14.

FIGS. 14A and 14B illustrate a further embodiment of the present disclosure, wherein the snap-on filter assembly 1000 is shown without an opening or orifice, but rather with a stem-cap 1040 integrally formed with the filter cap itself. Filter assembly 1000 comprises an integrally-formed integrated cap section 1010, spaced-apart, annular end ring 1030, and a generally cylindrically-shaped, pleated filter 1020 intermediate between cap 1010 and end ring 1030, the filter 1020 extending in a generally closed, circumferential path and which includes a closed, interior path (not shown). As illustrated in the Figure, the integrated cap 1010 may further, optionally comprise one or more (two are shown) integrally-formed handles 1012, 1014 as shown and described previously, a formed edge or rim 1017 circumscribing the exterior of the cap 1010, and an opening 1041 (not shown), such as a formed or molded hole or other appropriate opening, formed in the cap, wherein the opening 1041 is covered by stem cover means 1040 which extends upwardly from the top surface 1011 of cap 1010. As can be seen in FIG. 14B, described in more detail below, opening 1041 extends from the top surface 1011 of cap 1010 through the cap to the closed, interior airflow path 1050 formed by filter 1020. As further illustrated in FIG. 14A, the cap 1010 may also optionally comprise a plurality of integrally-formed support struts 1015, to add structural integrity to the cap section 1010. As illustrated in the Figure, struts 1015 may extend radially outward from the stem cover means 1040 towards, and optionally integrate with, rim 1017 of the cap. While two handle-portions 1012 and 1014 are illustrated, it will be recognized that the filter assemblies described herein may have no handles, a single handle, or more than two handles, which may be oriented in a variety of manners, such as perpendicular to the top face of the cap portion or in a plane substantially in alignment with the top surface of cap 1010, without limitation.

As illustrated more clearly in FIG. 14B, which is a cross-sectional view of the filter assembly 1000 of FIG. 14A, taken along line 14-14, the stem cap or stem cover means 1040 comprises an outer portion 1044, an interior opening 1041 opening into the central region of the filter assembly 1000 and opposite the top face of cap 1011, and a shaped inner region 1042 which may optionally further comprise an inner gripping portion or gripping means 1046. The stem cover means 1040 is arranged to be placed over the stem or stem head (not shown) of the filter cage when the filter assembly 1000 is engaged with a vacuum appliance as described above. In accordance with one aspect of this embodiment, the stem cover means 1040 may be retained in position by means of the shaped inner region 1042, alone or in combination with one or more optional gripping means 1046 which can act to grip the filter cage stem or stem head and retain the filter assembly 1000 in place, engaged with the vacuum appliance. In accordance with certain aspects of this embodiment, the cover means 1040 may be substantially hollow, having a shaped inner region 1042 whose shape corresponds to the filter cage stem with which it will interact and engage. While the cover means 1040 is illustrated to be substantially cylindrical in shape, it may have a domed or otherwise shaped outer section 1044, which is opposite the opening 1041 in the cover means. The optional gripping means 1046 may comprise one or more resilient arms or equivalent gripping means so as to more tightly engage the stem or stem head of a filter cage, particularly when the stem is not shaped, but rather is of standard, cylindrical (threaded or not) design.

In an exemplary typical method of use, the filter assembly 1100 is simply pushed down onto and over an exposed filter cage assembly portion of a vacuum appliance, such as the type illustrated generally in FIG. 6 herein, wherein interior air flowpath 1050 defined at least in part by filter 1020 circumscribes the exterior of the filter cage assembly. The assembly 1100 is pushed down such that stem cover 1040 is simply pushed onto the exposed and downwardly-extending filter cage stem head. The shaped inner region 1042 of the stem cover 1040 is just smaller than the outer width of the cage stem head, so that when pushed onto a vacuum appliance cage stem, the inner region 1042 deforms slightly and grips the cage stem. Alternatively, and equally acceptable, in the event that one or more gripping means are included within stem cover 1040, the inner region 1042 will be slightly larger than the outer width of the cage stem head, so that when pushed onto a vacuum appliance cage stem, the gripping means 1046 deform slightly and thereby grip the cage stem. Tension between the shaped inner region 1042 and the cage stem, or between the gripping means 1046 and the cage stem will work to retain the filter assembly 1000 in place and engaged with a vacuum appliance, even when vacuum is not being applied.

Figure 15:
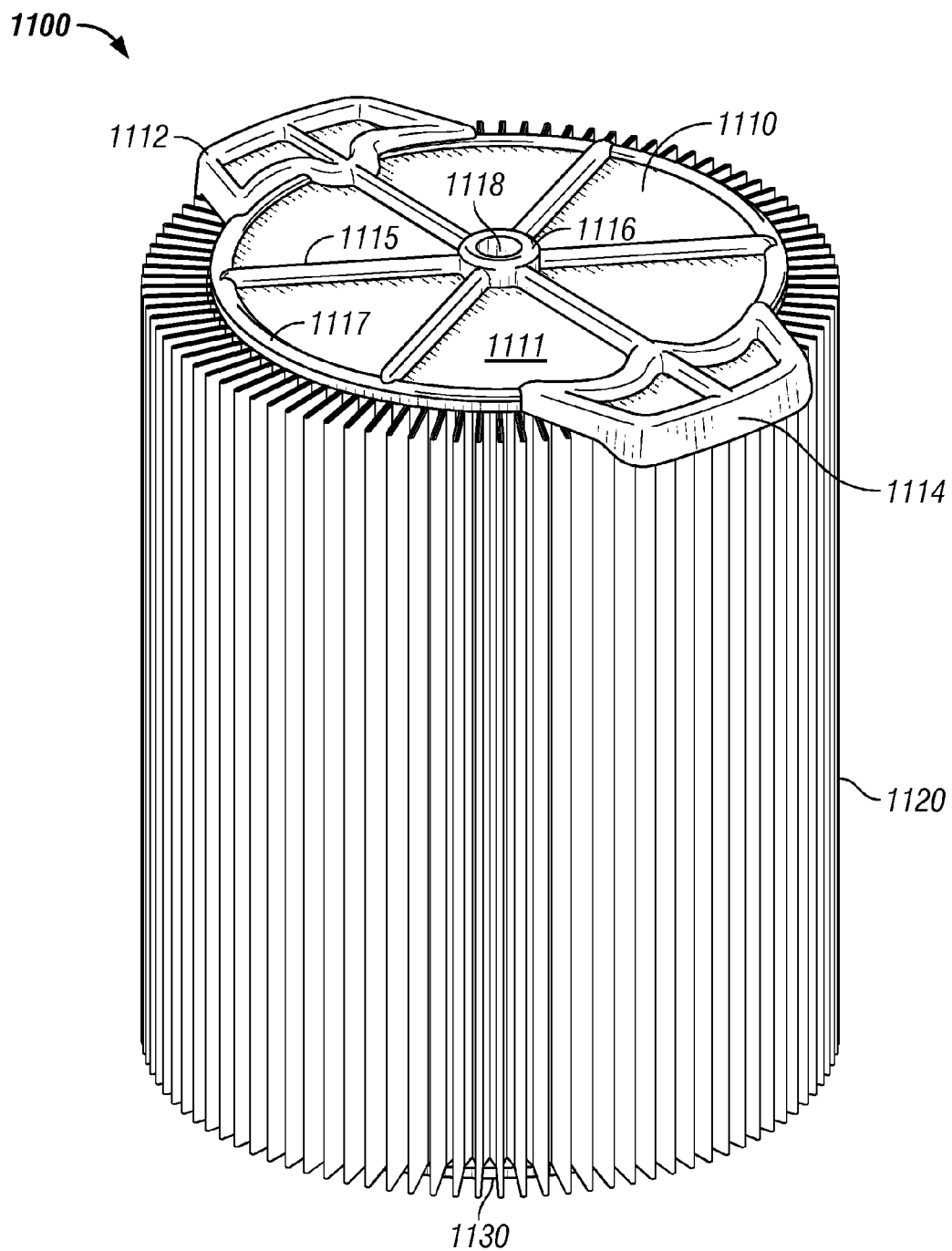
FIG. 15 illustrates a perspective view of an exemplary filter assembly in accordance with the present disclosure.

FIG. 15 illustrates a perspective view of a further embodiment of the present disclosure, the design of filter assembly 1100. Filter assembly 1100 is a design variant of the filter assembly 100 described herein, and which comprises an integrally-formed integrated cap section 1110, spaced-apart, annular end ring 1130, and a generally cylindrically-shaped, pleated filter 1120 intermediate between cap 1110 and end ring 1130, the filter 1120 extending in a generally closed, circumferential path and which includes a closed, interior path (not shown). As illustrated in the Figure, the integrated cap 1110 may further, optionally comprise one or more (two are shown) integrally-formed handles 1112, 1114 as shown, a formed edge or rim 1117, and an opening 1118, such as a formed or molded hole, slit, or other appropriate opening, formed either in the center of the cap 1110, or formed off-center of the central, vertical axis of the filter, as appropriate. Opening 1118 extends from the top surface 1111 of cap 1110 through the cap to the closed, interior airflow path formed by filter 1120. The cap 1110 may also optionally comprise a plurality of integrally-formed support struts 1115, to add structural integrity to the cap section 110. As illustrated in the Figure, struts 1115 may extend radially outward from the opening 1118 towards, and optionally integrate with, rim 1117 of the cap. In a non-limiting manner, and as shown in the figure, the handle portions 1112 and 1114 may be substantially diametrically opposed in orientation, and can extend partially over the top and edges of the pleated filter 1120, so as to allow for providing the user with a gripping surface to aid in filter removal from the filter cage of a vacuum appliance when changing filters. While two handle-portions 1112 and 1114 are illustrated, it will be recognized that the filter assemblies described herein may have no handles, a single handle, or more than two handles, which may be oriented in a variety of manners, such as perpendicular to the top face of the cap portion or in a plane substantially in alignment with the top surface of cap 1110, without limitation. As also illustrated in FIG. 15, the opening 1118 in cap 1110 can be optionally circumscribed by an integrally- or non-integrally formed annular retaining ring 1116 having a general taurus-like (donut) shape (or other shape, as desired or appropriate) of such a size, shape and internal diameter that the ball or lead-end flange on the leading end of a mounting shaft on a vacuum's filter cage can be forced up and through the opening 1118, in a manner as discussed herein above, so as to retain a filter assembly of the present disclosure on the filter cage and seated against the base of the vacuum appliance. If retaining ring 1116 is integral, it will be formed into cap 1110 as part of the manufacturing process. In the event that ring 1116 is non-integral and is a separate element of the filter assembly, it may be attached to the top surface 1111 through any number of appropriate chemical (e.g., glue) or mechanical methods, without limitation.

Figure 16:
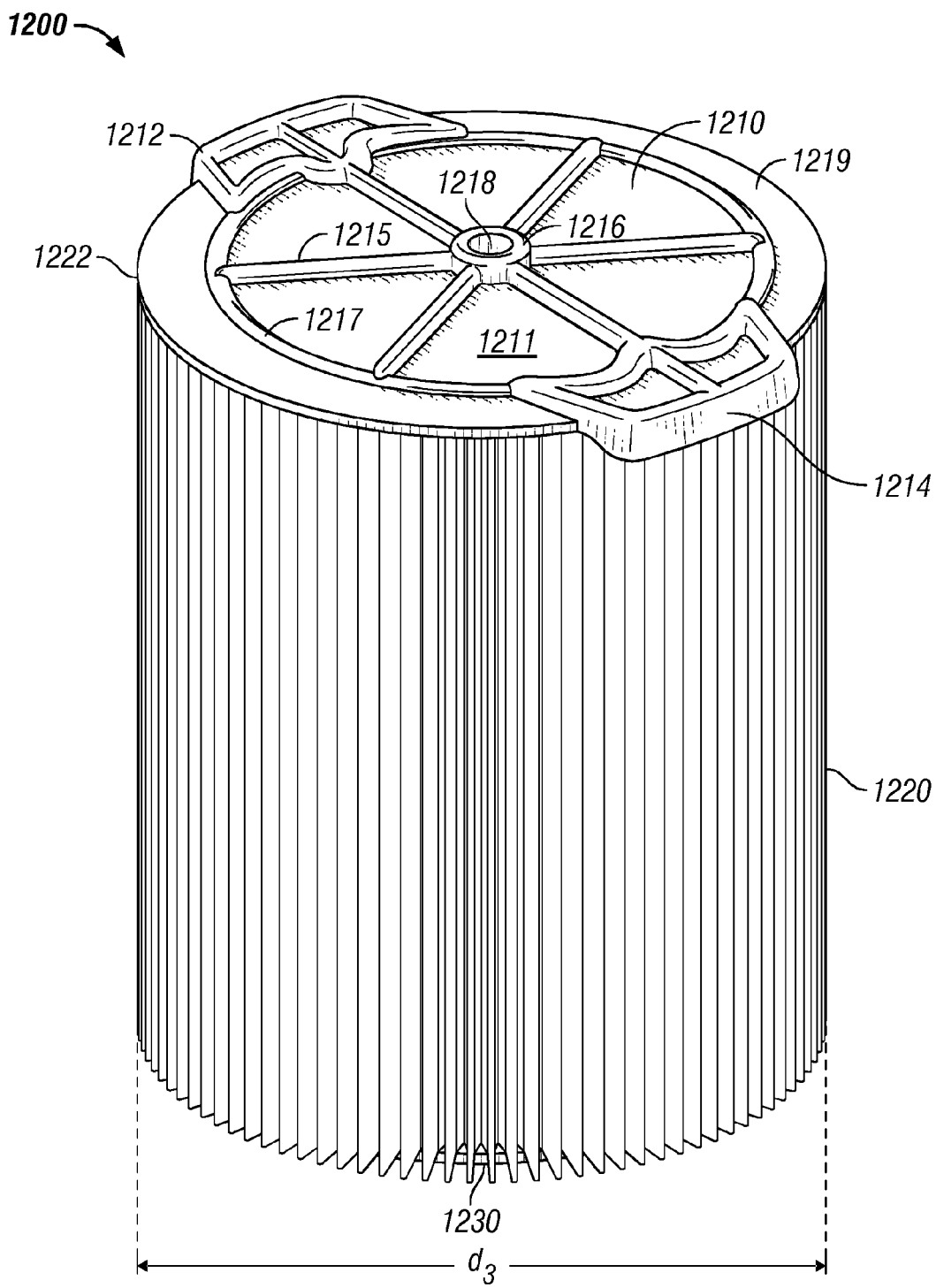
FIG. 16 illustrates a perspective view of an exemplary filter assembly in accordance with the present disclosure.

In FIG. 16, a perspective view of the design of a filter assembly 1200 is illustrated, in a manner similar to that presented in FIG. 15. As shown therein, the filter assembly 1200 comprises an integrally-formed an integrated cap section 1210, an end ring 1230, and, a generally cylindrically-shaped, pleated filter 1220 intermediate between cap 1210 and end ring 1230 and extending in a closed, circumferential path and which includes a closed, interior path (not shown), similar to the design of filter assembly 100 described above. As illustrated in the Figure, the integrated cap 1210 may further, optionally comprise one or more (two are shown) integrally-formed handles 1212, 1214 as shown, a formed intermediate rim 1217, an opening 1218, such as a formed or molded hole, slit, or other appropriate opening, formed either in the center of the cap 1210, or formed off-center of the central, vertical axis of the filter, as appropriate. Opening 1218 extends from the top surface 1211 of cap 1210 through the cap to the closed, interior airflow path formed by filter 1220. The cap 1210 may also optionally comprise a plurality of integrally-formed support struts 1215, to add structural integrity to the cap section 110. As illustrated in the Figure, struts 1215 may extend radially outward from the opening 1218 towards, and optionally integrate with, intermediate rim 1217 of the cap. As also shown in FIG. 16, cap 1210 of filter 1200 may further comprise an outer edge region 1219 that substantially circumscribes the rim 1217, and extends outwardly to a distance such that its outer edge 1222 is substantially in the same plane as, and does not extend past, the outer edge (diameter $d_3$) of the filter 1220. In a non-limiting manner, and as shown in the figure, the handle portions 1212 and 1214 may be substantially diametrically opposed in orientation, and can extend partially over the top and edges of the pleated filter 1220, so as to allow for providing the user with a gripping surface to aid in filter removal from the filter cage of a vacuum appliance when changing filters. While two handle-portions 1212 and 1214 are illustrated, it will be recognized that the filter assemblies described herein may have no handles, a single handle, or more than two handles, which may be oriented in a variety of manners, such as perpendicular to the top face of the cap portion or in a plane substantially in alignment with the top surface of cap 1110, without limitation. As also illustrated in FIG. 16, the opening 1218 in cap 1210 can be optionally circumscribed by an integrally- or non-integrally formed annular retaining ring 1216 having a general shape of such a size, shape and internal diameter that the ball or lead-end flange on the leading end of a mounting shaft on a vacuum appliance's filter cage can be forced up and through the opening 1218, in a manner as discussed herein above, so as to retain a filter assembly 1200 of the present disclosure on the filter cage (not shown) and seated against the base of the vacuum appliance. If retaining ring 1216 is integral, it will preferably be formed into cap 1210 as part of the manufacturing process. In the event that ring 1216 is non-integral and is a separate element of the filter assembly, it may be attached to the top surface 1211 through any number of appropriate chemical (e.g., glue) or mechanical methods or mechanical means (such as by a flexible hinge portion of elastomeric material), without limitation, as described above.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

What is claimed is:

1. A filter cage assembly, comprising:
a longitudinal axis;
an open bottom and a spaced apart, substantially parallel top surface;
one or more circumferential ribs circumscribing the cage and being oriented substantially perpendicular to the longitudinal axis;
one or more longitudinally angled rib members formed at an angle relative to the longitudinal axis of the filter cage;
a stem extending outward from the top surface and along the longitudinal axis of the filter cage,
wherein the circumferential ribs and the longitudinal ribs form a plurality of openings in the cage, and
wherein the stem comprises a head portion and a neck region intermediate between the top surface of the cage and the head portion, the head portion having a diameter greater than that of the neck region; and
further comprising a shoulder region formed between the top surface of the cage and the neck region, the shoulder region having a diameter greater than that of the neck region,
wherein the neck region comprises one or more rib members circumscribing the exterior surface of the neck region.

2. The filter cage of claim 1, wherein the neck region comprises one or more rib members circumscribing the exterior surface of the neck region.

3. The filter cage of claim 1, wherein the head portion is semi-hemispherical in shape.

4. The filter cage of claim 1, wherein the head portion comprises one or more indents formed in an outer face of the head portion.

5. The filter cage of claim 1, wherein the stem is made of a polymeric material.

6. The filter cage of claim 1, wherein the one or more longitudinally angled rib members are formed at a non-zero angle relative to the longitudinal axis of the filter cage.

7. The filter cage of claim 1, wherein the outer surface of the longitudinally angled ribs extend outward from the outer surface of the filter cage.

8. A system for vacuuming materials, the system comprising:
a wet and dry vacuum cleaner; and
a filter cage to support a filter, the filter cage coupled to the vacuum cleaner and comprising:
a longitudinal axis;
an open bottom and a spaced apart, substantially parallel top surface;
one or more circumferential ribs circumscribing the cage and being oriented substantially perpendicular to the longitudinal axis;
one or more longitudinally angled rib members formed at an angle relative to the longitudinal axis of the filter cage;
a stem extending outward from the top surface and along the longitudinal axis of the filter cage,
wherein the circumferential ribs and the longitudinal ribs form a plurality of openings in the cage, and
wherein the stem comprises a head portion and a neck region intermediate between the top surface of the cage and the head portion, the head portion having a diameter greater than that of the neck region; and
further comprising a shoulder region formed between the top surface of the cage and the neck region, the shoulder region having a diameter greater than that of the neck region, and
wherein the neck region comprises one or more rib members circumscribing the exterior surface of the neck region.

9. The system of claim 8, further comprising a float assembly within the filter cage.

10. The filter cage of claim 8, wherein the neck region comprises one or more rib members circumscribing the exterior surface of the neck region.

11. The filter cage of claim 8, wherein the head portion of the stem is semi-hemispherical in shape.

12. The filter cage of claim 8, wherein the stem is made of a polymeric material.

13. A filter cage for use with a wet and dry vacuum cleaner having a filter element, the filter cage comprising:
an open bottom and a spaced-apart, substantially parallel cage top surface;
a threaded stem extending upwardly from outer face of the top surface;
a plurality of openings to provide for the flow of air or other media downstream of a filter element that fits over the filter cage, the openings being formed by a plurality of longitudinally angled rib members and a plurality of circumferential rib members; and
a solid head member comprising a shaped head region, a neck region, and interior grooves formed within the head member, the grooves being formed so as to mate with the threads of the threaded stem,
wherein the head region has a diameter greater than that of the neck region, and
wherein the neck region comprises one or more rib members circumscribing the exterior surface of the neck region.

14. The filter cage of claim 13, further comprising a shoulder region formed between the top surface of the cage and the neck region, the shoulder region having a diameter greater than that of the neck region.

15. The filter cage of claim 13, wherein the head portion is semi-hemispherical in shape.

16. The filter cage of claim 13, wherein the stem is made of a polymeric material.

* * * * *